(12) United States Patent
Takahashi

(10) Patent No.: US 11,928,786 B2
(45) Date of Patent: Mar. 12, 2024

(54) THREE-DIMENSIONAL SHAPE DATA EDITING APPARATUS AND NON-TRANSITORY COMPUTER READABLE MEDIUM STORING THREE-DIMENSIONAL SHAPE DATA EDITING PROGRAM

(71) Applicant: FUJIFILM Business Innovation Corp., Tokyo (JP)

(72) Inventor: Tomonari Takahashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 904 days.

(21) Appl. No.: 16/747,562

(22) Filed: Jan. 21, 2020

(65) Prior Publication Data

US 2021/0049826 A1    Feb. 18, 2021

(30) Foreign Application Priority Data

Aug. 15, 2019    (JP) ................................. 2019-149096

(51) Int. Cl.
    *G06T 19/20*    (2011.01)
(52) U.S. Cl.
    CPC ...... *G06T 19/20* (2013.01); *G06T 2219/2021* (2013.01)
(58) Field of Classification Search
    None
    See application file for complete search history.

(56) References Cited

U.S. PATENT DOCUMENTS

| 6,069,634 | A | 5/2000 | Gibson |
| 6,343,936 | B1 | 2/2002 | Kaufman et al. |
| 2012/0002850 | A1* | 1/2012 | Ijiri ........................ G06T 19/20 |
| | | | 382/128 |
| 2019/0134915 | A1* | 5/2019 | Schmidt .................. G06T 17/20 |

FOREIGN PATENT DOCUMENTS

| JP | 10208078 A | * | 8/1998 | ............. G06T 19/20 |
| JP | H10-208078 | | 8/1998 | |
| JP | 2001-084395 | | 3/2001 | |
| JP | 2001084395 A | * | 3/2001 | |
| JP | 2002538915 | | 11/2002 | |
| JP | 2019106177 | | 6/2019 | |

OTHER PUBLICATIONS

"Office Action of Japan Counterpart Application", dated Jul. 25, 2023, with English translation thereof, p. 1-p. 8.

* cited by examiner

*Primary Examiner* — Yi Wang
(74) *Attorney, Agent, or Firm* — JCIPRNET

(57) ABSTRACT

A three-dimensional shape data editing apparatus includes a processor configured to set, based on three-dimensional shape data of a surface of a three-dimensional shape of an object configured by using a formation surface of at least one of plural flat surfaces or curved surfaces, for each of plural divided three-dimensional regions, a distance from a predetermined location of the region to the formation surface of the three-dimensional shape of the object configured by the formation surface.

19 Claims, 24 Drawing Sheets

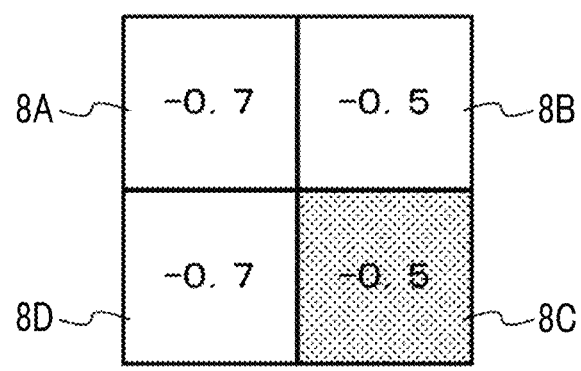
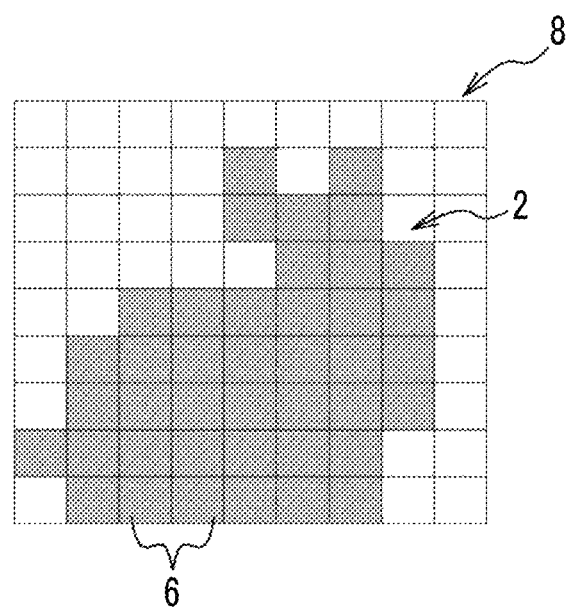

FIG. 27

| -0.4 | -0.4 | -0.4 | -0.4 | -0.4 | -0.4 | -0.4 | -0.4 | -0.4 |
|---|---|---|---|---|---|---|---|---|
| -0.4 | 0.5 | 0.5 | 0.5 | 0.5 | 0.5 | 0.5 | 0.5 | -0.4 |
| -0.4 | 0.5 | 2.3 | 2.3 | 2.3 | 2.3 | 2.3 | 0.5 | -0.4 |
| -0.4 | 0.5 | 2.3 | 3.8 | 3.8 | 3.8 | 2.3 | 0.5 | -0.4 |
| -0.4 | 0.5 | 2.3 | 3.8 | 4.4 | 3.8 | 2.3 | 0.5 | -0.4 |
| -0.4 | 0.5 | 2.3 | 3.8 | 4.4 | 3.8 | 2.3 | 0.5 | -0.4 |
| -0.4 | 0.5 | 2.3 | 3.8 | 4.4 | 3.8 | 2.3 | 0.5 | -0.4 |
| -0.4 | 0.5 | 2.3 | 3.8 | 4.4 | 3.8 | 2.3 | 0.5 | -0.4 |
| -0.4 | 0.5 | 2.3 | 3.8 | 4.4 | 3.8 | 2.3 | 0.5 | -0.4 |
| -0.4 | 0.5 | 2.3 | 3.8 | 4.4 | 3.8 | 2.3 | 0.5 | -0.4 |
| -0.4 | 0.5 | 2.3 | 3.8 | 4.4 | 3.8 | 2.3 | 0.5 | -0.4 |
| -0.4 | 0.5 | 2.3 | 3.8 | 3.8 | 3.8 | 2.3 | 0.5 | -0.4 |
| -0.4 | 0.5 | 2.3 | 2.3 | 2.3 | 2.3 | 2.3 | 0.5 | -0.4 |
| -0.4 | 0.5 | 0.5 | 0.5 | 0.5 | 0.5 | 0.5 | 0.5 | -0.4 |
| -0.4 | -0.4 | -0.4 | -0.4 | -0.4 | -0.4 | -0.4 | -0.4 | -0.4 |

FIG. 28

| | | | | | | | | | ROW NUMBER |
|---|---|---|---|---|---|---|---|---|---|
| -1.4 | -1.4 | -1.4 | -1.4 | -1.4 | -1.4 | -1.4 | -1.4 | -1.4 | 1 |
| -1.5 | -0.6 | -0.6 | -0.6 | -0.6 | -0.6 | -0.6 | -0.6 | -1.5 | 2 |
| -1.6 | -0.7 | 1.1 | 1.1 | 1.1 | 1.1 | 1.1 | -0.7 | -1.6 | 3 |
| -1.7 | -0.8 | 1.0 | 2.5 | 2.5 | 2.5 | 1.0 | -0.8 | -1.7 | 4 |
| -1.8 | -0.9 | 0.9 | 2.4 | 3.0 | 2.4 | 0.9 | -0.9 | -1.8 | 5 |
| -1.9 | -1.0 | 0.8 | 2.3 | 2.9 | 2.3 | 0.8 | -1.0 | -1.9 | 6 |
| -2.0 | -1.1 | 0.7 | 2.2 | 2.8 | 2.2 | 0.7 | -1.1 | -2.0 | 7 |
| -2.1 | -1.2 | 0.6 | 2.1 | 2.7 | 2.1 | 0.6 | -1.2 | -2.1 | 8 |
| -2.2 | -1.3 | 0.5 | 2.0 | 2.6 | 2.0 | 0.5 | -1.3 | -2.2 | 9 |
| -2.3 | -1.4 | 0.4 | 1.9 | 2.5 | 1.9 | 0.4 | -1.4 | -2.3 | 10 |
| -2.4 | -1.5 | 0.3 | 1.8 | 2.4 | 1.8 | 0.3 | -1.5 | -2.4 | 11 |
| -2.5 | -1.6 | 0.2 | 1.7 | 1.7 | 1.7 | 0.2 | -1.6 | -2.5 | 12 |
| -2.6 | -1.7 | 0.1 | 0.1 | 0.1 | 0.1 | 0.1 | -1.7 | -2.6 | 13 |
| -2.7 | -1.8 | -1.8 | -1.8 | -1.8 | -1.8 | -1.8 | -1.8 | -2.7 | 14 |
| -2.8 | -2.8 | -2.8 | -2.8 | -2.8 | -2.8 | -2.8 | -2.8 | -2.8 | 15 |

FIG. 29

| | 28A | | | 28B | | | | 8 |
|---|---|---|---|---|---|---|---|---|
| -1.4 | -1.4 | -1.4 | -1.4 | -1.4 | -1.4 | -1.4 | -1.4 | -1.4 |
| -1.4 | -0.5 | -0.5 | -0.5 | -0.5 | -0.5 | -0.5 | -0.5 | -1.4 |
| -1.4 | -0.5 | 1.3 | 1.3 | 1.3 | 1.3 | 1.3 | -0.5 | -1.4 |
| -1.4 | -0.5 | 1.3 | 2.8 | 2.8 | 2.8 | 1.3 | -0.5 | -1.4 |
| -1.4 | -0.5 | 1.3 | 2.8 | 3.4 | 2.8 | 1.3 | -0.5 | -1.4 |
| -1.4 | -0.5 | 1.3 | 2.8 | 3.4 | 2.8 | 1.3 | -0.5 | -1.4 |
| -1.4 | -0.5 | 1.3 | 2.8 | 3.4 | 2.8 | 1.3 | -0.5 | -1.4 |
| -1.4 | -0.5 | 1.3 | 2.8 | 3.4 | 2.8 | 1.3 | -0.5 | -1.4 |
| -1.4 | -0.5 | 1.3 | 2.8 | 3.4 | 2.8 | 1.3 | -0.5 | -1.4 |
| -1.4 | -0.5 | 1.3 | 2.8 | 3.4 | 2.8 | 1.3 | -0.5 | -1.4 |
| -1.4 | -0.5 | 1.3 | 2.8 | 3.4 | 2.8 | 1.3 | -0.5 | -1.4 |
| -1.4 | -0.5 | 1.3 | 2.8 | 2.8 | 2.8 | 1.3 | -0.5 | -1.4 |
| -1.4 | -0.5 | 1.3 | 1.3 | 1.3 | 1.3 | 1.3 | -0.5 | -1.4 |
| -1.4 | -0.5 | -0.5 | -0.5 | -0.5 | -0.5 | -0.5 | -0.5 | -1.4 |
| -1.4 | -1.4 | -1.4 | -1.4 | -1.4 | -1.4 | -1.4 | -1.4 | -1.4 |

| -3.4 | -3.4 | -3.4 | -3.4 | -3.4 | -3.4 | -3.4 | -3.4 | -3.4 |
|------|------|------|------|------|------|------|------|------|
| -3.4 | -2.5 | -2.5 | -2.5 | -2.5 | -2.5 | -2.5 | -2.5 | -3.4 |
| -3.4 | -2.5 | -0.7 | -0.7 | -0.7 | -0.7 | -0.7 | -2.5 | -3.4 |
| -3.4 | -2.5 | -0.7 | 0.8 | 0.8 | 0.8 | -0.7 | -2.5 | -3.4 |
| -3.4 | -2.5 | -0.7 | 0.8 | 1.4 | 0.8 | -0.7 | -2.5 | -3.4 |
| -3.4 | -2.5 | -0.7 | 0.8 | 1.4 | 0.8 | -0.7 | -2.5 | -3.4 |
| -3.4 | -2.5 | -0.7 | 0.8 | 1.4 | 0.8 | -0.7 | -2.5 | -3.4 |
| -3.4 | -2.5 | -0.7 | 0.8 | 1.4 | 0.8 | -0.7 | -2.5 | -3.4 |
| -3.4 | -2.5 | -0.7 | 0.8 | 1.4 | 0.8 | -0.7 | -2.5 | -3.4 |
| -3.4 | -2.5 | -0.7 | 0.8 | 1.4 | 0.8 | -0.7 | -2.5 | -3.4 |
| -3.4 | -2.5 | -0.7 | 0.8 | 1.4 | 0.8 | -0.7 | -2.5 | -3.4 |
| -3.4 | -2.5 | -0.7 | 0.8 | 0.8 | 0.8 | -0.7 | -2.5 | -3.4 |
| -3.4 | -2.5 | -0.7 | -0.7 | -0.7 | -0.7 | -0.7 | -2.5 | -3.4 |
| -3.4 | -2.5 | -2.5 | -2.5 | -2.5 | -2.5 | -2.5 | -2.5 | -3.4 |
| -3.4 | -3.4 | -3.4 | -3.4 | -3.4 | -3.4 | -3.4 | -3.4 | -3.4 |

FIG. 33

| -1.4 | -1.4 | -1.4 | -1.4 | -1.4 | -1.4 | -1.4 | -1.4 | -1.4 |
|---|---|---|---|---|---|---|---|---|
| -1.4 | -0.5 | -0.5 | -0.5 | -0.5 | -0.5 | -0.5 | -0.5 | -1.4 |
| -1.4 | -0.5 | 0.7 | 0.7 | 0.7 | 0.7 | 0.7 | -0.5 | -1.4 |
| -1.4 | -0.5 | 0.7 | -0.8 | -0.8 | -0.8 | 0.7 | -0.5 | -1.4 |
| -1.4 | -0.5 | 0.7 | -0.8 | -1.4 | -0.8 | 0.7 | -0.5 | -1.4 |
| -1.4 | -0.5 | 0.7 | -0.8 | -1.4 | -0.8 | 0.7 | -0.5 | -1.4 |
| -1.4 | -0.5 | 0.7 | -0.8 | -1.4 | -0.8 | 0.7 | -0.5 | -1.4 |
| -1.4 | -0.5 | 0.7 | -0.8 | -1.4 | -0.8 | 0.7 | -0.5 | -1.4 |
| -1.4 | -0.5 | 0.7 | -0.8 | -1.4 | -0.8 | 0.7 | -0.5 | -1.4 |
| -1.4 | -0.5 | 0.7 | -0.8 | -1.4 | -0.8 | 0.7 | -0.5 | -1.4 |
| -1.4 | -0.5 | 0.7 | -0.8 | -1.4 | -0.8 | 0.7 | -0.5 | -1.4 |
| -1.4 | -0.5 | 0.7 | -0.8 | -0.8 | -0.8 | 0.7 | -0.5 | -1.4 |
| -1.4 | -0.5 | 0.7 | 0.7 | 0.7 | 0.7 | 0.7 | -0.5 | -1.4 |
| -1.4 | -0.5 | -0.5 | -0.5 | -0.5 | -0.5 | -0.5 | -0.5 | -1.4 |
| -1.4 | -1.4 | -1.4 | -1.4 | -1.4 | -1.4 | -1.4 | -1.4 | -1.4 |

THREE-DIMENSIONAL SHAPE DATA EDITING APPARATUS AND NON-TRANSITORY COMPUTER READABLE MEDIUM STORING THREE-DIMENSIONAL SHAPE DATA EDITING PROGRAM

CROSS-REFERENCE TO RELATED APPLICATIONS

This application is based on and claims priority under 35 USC 119 from Japanese Patent Application No. 2019-149096 filed Aug. 15, 2019.

BACKGROUND

(i) Technical Field

The present invention relates to a three-dimensional shape data editing apparatus and a non-transitory computer readable medium storing a three-dimensional shape data editing program.

(ii) Related Art

JP2001-084395A discloses a three-dimensional data synthesis method of synthesizing a plurality of pieces of three-dimensional data which has a shape represented by a boundary representation method and to which a texture is added into one piece of three-dimensional data, in which the plurality of pieces of three-dimensional data are converted from the shape representation of the boundary representation method into shape representation by a volume method using feature amounts of a plurality of voxels constituting a volume, an attribute of the texture is given to the feature amount of the voxel at this time, the plurality of pieces of three-dimensional data are integrated by mixing the feature amounts of the voxels, and the integrated three-dimensional data is inversely converted into shape representation by the boundary representation method.

JP1998-208078A discloses a system for deforming a graphic object displayed together with another graphic object, the system including means which includes a computer for characterizing the graphic object as a volumetric object with volume elements, a user interface coupled to the computer for selecting and moving a selected one of the volume elements, graphic object deformation means which moves the selected volume element by an amount designated by the user interface, in response to the user interface, and deforms the graphic object as a result of the movement, means which detects and prevents a collision between graphic objects at the time of deformation of the graphic object, relaxation means which relaxes relative positions of the elements based on elasticity of the elements, and means which includes a display for reproducing a result of moving, deforming, and relaxing the volumetric graphic object, by being coupled to an output of the relaxation means, in which the graphic object is rapidly deformed.

SUMMARY

In a case of representing a three-dimensional shape of an object, for example, three-dimensional shape data defined by combining three-dimensional elements such as a rectangular parallelepiped or a cube may be used.

In a case where the three-dimensional shape is represented by combining the three-dimensional elements, a curved surface portion of the object is also represented by the three-dimensional elements, so it is more difficult to make a smooth surface than a case of representing a surface of the object including the curved surface portion by combining polygons having shapes such as a triangle and the like, for example.

In addition, in a case where three-dimensional shape data configured by three-dimensional elements is edited, a shape of the three-dimensional shape data is different from the original three-dimensional shape data configured using at least one formation surface of a plurality of flat surfaces or curved surfaces, so that it is not enough to hold the original three-dimensional shape.

Therefore, the three-dimensional shape data configured by the three-dimensional elements may be converted into three-dimensional shape data configured by polygons. Meanwhile, in a case where a conversion method in the related art such as a marching cubes (MC) method of generating continuous flat surfaces by applying polygons to a pattern with or without three-dimensional elements is used for this conversion, as it is, the shape is different from the three-dimensional shape of the original object such as representation of a curved surface portion or an uneven portion of the object along the shape of the three-dimensional element or the like, in some cases.

Aspects of non-limiting embodiments of the present disclosure relate to a three-dimensional shape data editing apparatus and a non-transitory computer readable medium storing a three-dimensional shape data editing program capable of converting a three-dimensional shape of an object configured by three-dimensional elements into a three-dimensional shape configured by polygons.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a three-dimensional shape data editing apparatus including: a processor configured to set, based on three-dimensional shape data of a surface of a three-dimensional shape of an object configured by using a formation surface of at least one of a plurality of flat surfaces or curved surfaces, for each of a plurality of divided three-dimensional regions, a distance from a predetermined location of the region to the formation surface of the three-dimensional shape of the object configured by the formation surface.

BRIEF DESCRIPTION OF THE DRAWINGS

Exemplary embodiment(s) of the present invention will be described in detail based on the following figures, wherein:

FIG. 7 is a diagram illustrating an example of an arrangement state of the voxels;

FIG. 8 is a diagram illustrating an example of three-dimensional shape data of the object generated by the voxel conversion process;

FIG. 27 is a diagram illustrating an example of three-dimensional shape data obtained by enlarging the object;

FIG. 28 is a diagram illustrating an example of three-dimensional shape data obtained by designating a value to be subtracted for each region;

FIG. 29 is a diagram illustrating an example in which a calculation target region is divided into a plurality of groups;

FIG. 31 is a diagram illustrating another example of the three-dimensional shape data used for explaining the deformation process on the polygons;

FIG. 33 is a diagram illustrating an example of three-dimensional shape data obtained by synthesizing two pieces of three-dimensional shape data.

DETAILED DESCRIPTION

Figure 1:
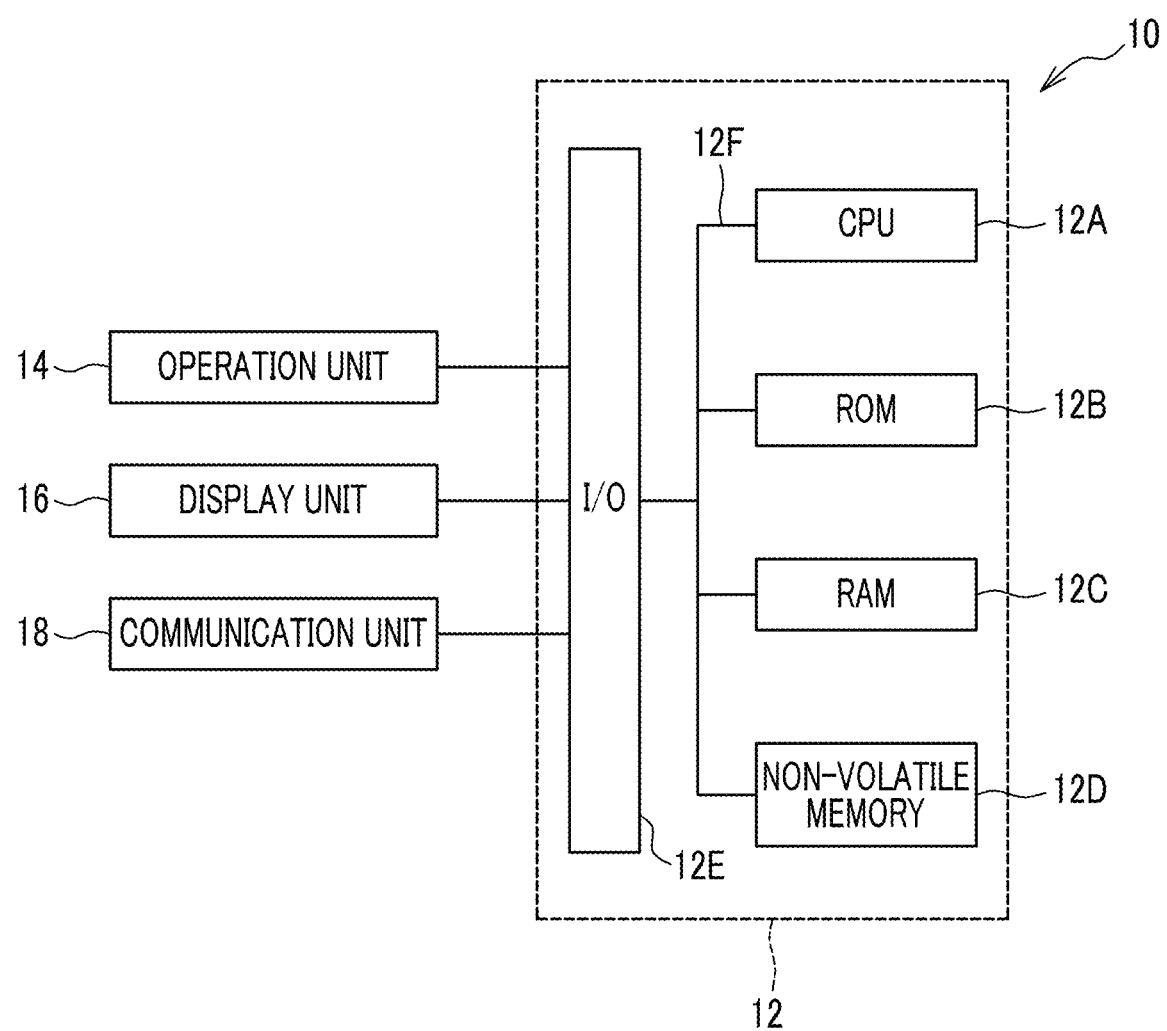
FIG. 1 is a diagram illustrating a configuration example of an editing apparatus.

Hereinafter, an exemplary embodiment will be described with reference to drawings. The same reference numerals are given to the same components or processes throughout all the drawings, and duplicated explanations are not repeated.

First, a configuration of a three-dimensional shape data editing apparatus 10 according to the present exemplary embodiment will be described with reference to FIG. 1.

The editing apparatus 10 is configured by a computer 12, for example. The computer 12 includes a central processing unit (CPU) 12A which is an example of a processor, a read only memory (ROM) 12B, a random access memory (RAM) 12C, a non-volatile memory 12D, and an input/output interface (I/O) 12E. The CPU 12A, the ROM 12B, the RAM 12C, the non-volatile memory 12D, and the I/O 12E are connected with one another via a bus 12F. In addition, an operation unit 14, a display unit 16, and a communication unit 18, are connected to the I/O 12E.

The non-volatile memory 12D is an example of a storage device in which stored information is maintained even in a case where power supplied to the non-volatile memory 12D is cut off, and for example, a semiconductor memory is used and a hard disk may be used. The non-volatile memory 12D is not necessarily built in the computer 12, and may be a portable storage device capable of being attached to and detached from the computer 12, such as a memory card.

The operation unit 14 is a functional unit of receiving an instruction from a user of the editing apparatus 10, and is configured to include an input device such as a mouse, a keyboard, a touch panel, and the like.

The display unit 16 is a functional unit of displaying information processed by the CPU 12A, and is configured to include a display device such as a liquid crystal display, an organic electro luminescence (EL) display, or the like.

The communication unit 18 includes an interface which is connected to, for example, a communication line such as an internet or a local area network (LAN) and performs data communication with an external device connected to the communication line.

Figure 2:
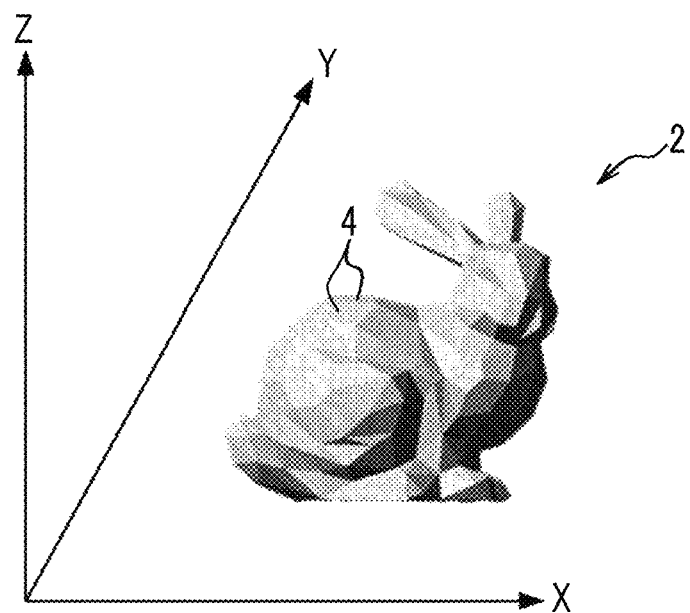
FIG. 2 is a diagram illustrating an example of a three-dimensional shape of an object represented by polygons.

FIG. 2 is a diagram illustrating an example of a three-dimensional shape of an object 2 represented by three-dimensional shape data. As illustrated in FIG. 2, the editing apparatus 10 represents the three-dimensional shape of the object 2 by using XYZ coordinates represented by an X-axis, a Y-axis, and a Z-axis. Hereinafter, the XYZ coordinates are referred to as a "three-dimensional coordinate space", and the three-dimensional shape of the object 2 is simply referred to as a "shape of the object 2".

As a data format of the three-dimensional shape data, for example, a data format constituting a surface of the object 2 by combining polygons 4 may be used.

The polygon 4 is a formation surface of each plane or each curved surface constituting the shape of the object 2. Although a shape of the polygon 4 is not limited, for example, a polygon such as a triangle or a quadrangle is used, and the shape of the object 2 is configured by combining a plurality of polygons 4. That is, three-dimensional shape data which defines the shape of the object 2 by using the polygon 4 includes, for example, a position and an arrangement direction of each polygon 4, information on connection with the adjacent polygon 4, and the like.

In addition to the polygon, a data format constituting the surface of the object 2 by combining functional curved surfaces such as a spline curved surface, a Bezier curved surface, or the like may be used.

In a case where the editing apparatus 10 edits three-dimensional shape data defining the shape of the object 2 by using the polygon 4 so as to deform the shape of the object 2, the shape of the object 2 is represented while the adjacent polygons 4 share a vertex and a side, so that in a case where the user deforms the shape of the object 2 at a location which the user wants to deform, an influence of the deformation spreads one after another on the polygon 4 adjacent to the deformed location and a location not intended to be deformed of the shape of the object 2 may be deformed.

Therefore, the editing apparatus 10 converts the three-dimensional shape data which defines the shape of the object 2 by using the polygon 4 into three-dimensional shape data defined by using voxels 6, and by editing the three-dimensional shape data configured by the voxels 6, the shape of the object 2 is deformed.

The voxel 6 is a basic element which constitutes a three-dimensional shape of the object 2, for example, a cube is used, and the voxel 6 is not limited to the cube, and another three-dimensional element such as a rectangular parallelepiped, a triangular pyramid, a sphere, a cylinder, or the like may be used. That is, the voxel 6 is an example of a three-dimensional element.

By stacking the voxels 6, a desired three-dimensional shape of the object 2 is represented. In addition, attributes indicating characteristics of the voxel 6 such as a color, a strength, a material, a texture, and the like may be set to each voxel 6. A color, a material, or the like of the object 2 is represented by the presence or absence of the voxel 6 and the attribute of the voxel 6.

"Material" includes at least one of information indicating a genre of a material such as resin, metal, rubber, or the like, information indicating a material name such as ABS, PLA, or the like, information indicating a product name, a product number, or the like of a commercially available material, information indicating a material such as a material name, an abbreviation, a number, or the like defined by standards such as ISO, JIS, and the like, or information indicating material properties such as thermal heat conductivity, conductivity, magnetism, and the like.

Further, "texture" includes an attribute representing physical properties information or touch, not just the color, such as reflectance, transmittance, gloss, and surface properties of the object 2.

The attribute includes an attribute pattern set by using at least one piece of information of a period, an equation, or other three-dimensional shape data. The attribute pattern includes at least one of continuously changing the color, the material, the texture, or the like of three-dimensional shape data according to repetition of a constant period, gradation, representation by a slope and a pole represented by the equation, other three-dimensional shape data, and the like and filling or continuously changing an instructed range of the three-dimensional shape data with an instructed shape.

As described above, the shape of the object 2 is represented by a set of the voxels 6, specifically, displayed by, for example, element values in X, Y, and Z coordinates in the three-dimensional coordinate space.

Figure 3:
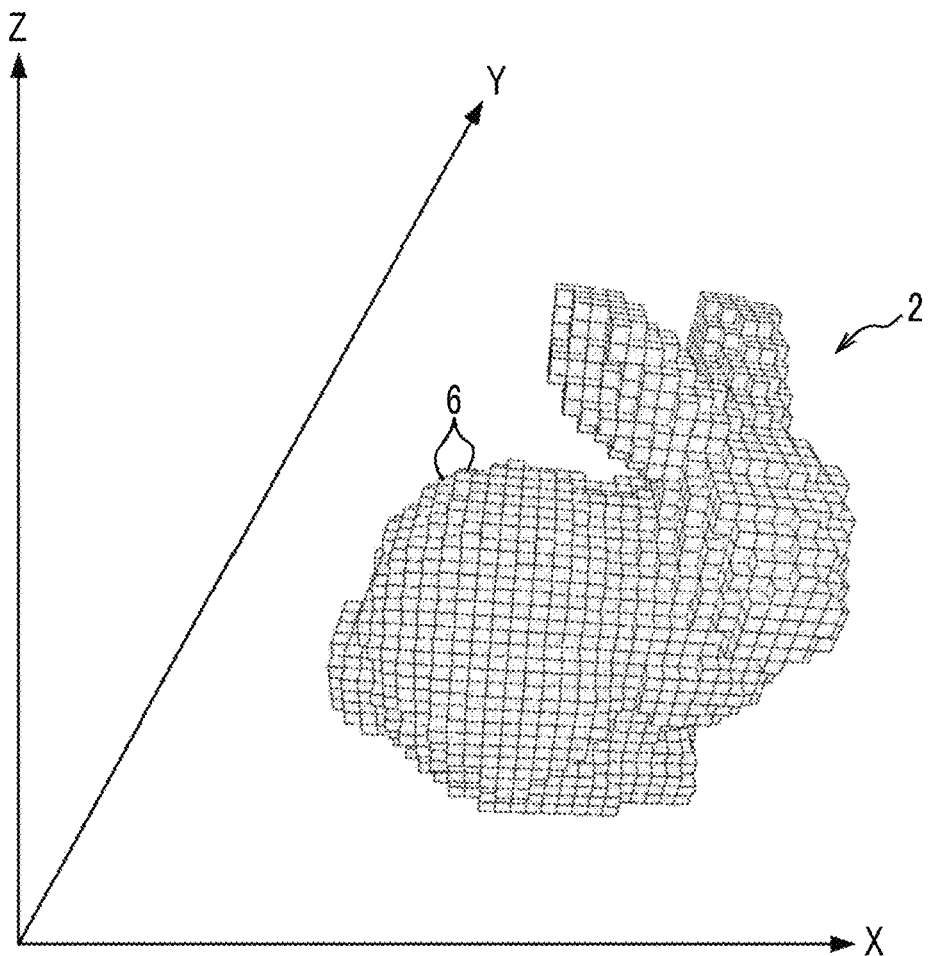
FIG. 3 is a diagram illustrating an example of a three-dimensional shape of the object represented by voxels.

FIG. 3 is a diagram illustrating an example of the shape of the object 2 represented by the voxels 6. In a case where coordinates in a three-dimensional coordinate space are represented by (X, Y, Z) in a case where the voxel 6 exists at coordinates (X, Y, Z), for example, "(X, Y, Z)≥1" is set.

On the other hand, in a case where the voxel 6 does not exist at the coordinates (X, Y, Z), the shape of the object 2 is represented by setting "(X, Y, Z)=0". That is, three-dimensional shape data which defines the shape of the object 2 by using the voxel 6 includes element values of coordinates (X, Y, Z) indicating the presence or absence of the voxel 6 and attributes associated with the voxel 6.

The shape of the object 2 is not necessarily represented by coordinates (X, Y, Z) in the three-dimensional coordinate space, and may be represented by an index number uniquely associated with the coordinates (X, Y, Z), for example. In this case, for example, in a case where a value associated with the index number is "1", the case indicates that the voxel 6 exists at a position represented by the index number. This index number is a number for identifying a region 8 to be described below.

The three-dimensional coordinate space is not limited to three-dimensional orthogonal coordinates such as X, Y, and Z, and for example, polar coordinates using r and θ may be used. In this case, in the same manner of representing the three-dimensional coordinate space as 1, 2, 3, . . . for each pitch of X, Y, and Z with index numbers, an index number may be associated with each pitch of r and θ, and a value equal to or more than 1 may be designated at a position represented by the index number so as to indicate that the voxel 6 exists. In a case where the voxels 6 having different shapes are respectively associated with the value equal to or more than 1, the voxel 6 having a shape corresponding to a set value is arranged at a designated position in the three-dimensional coordinate space.

Since three-dimensional shape data represents the shape of the object 2 by the presence or absence of the voxel 6 in a case where the three-dimensional shape data defined by the voxels 6 is modified so as to deform the shape of the object 2, there is no situation in which an influence of the deformation affects locations other than a location which the user wants to deform as in the case where the shape of the object 2 is deformed by modifying the three-dimensional shape data defined by the polygons 4. That is, in a case where the shape of the object 2 is deformed by editing the three-dimensional shape data defined by the voxel 6 such as addition and deletion of the voxel 6, it is possible to deform only the location which the user wants to deform.

In addition, in a case where the shape of the object 2 is deformed by modifying the three-dimensional shape data defined by the polygons 4, a connection state of the polygons 4 changes, and there may occur a situation in which there is a gap on a surface of the object 2 or the polygons 4 intersect with each other since a side and a vertex of the polygons 4 cannot be connected to each other, but in a case where the shape of the object 2 is deformed by modifying the three-dimensional shape data defined by the voxels 6, this situation does not occur.

Meanwhile, since the three-dimensional shape data defined by the voxel 6 represents the shape of the object 2 by combining the voxels 6, as compared with the case where the object 2 is configured by the polygons 4, an uneven portion is likely to occur on the curved surface portion of the object 2 to be configured, and the shape of the object 2 may be different from the previous shape in a case where the object 2 is configured by the voxels 6.

Therefore, in the editing apparatus 10, deformation of the object 2 is executed by using three-dimensional shape data defined by the voxel 6, and the three-dimensional shape data defined by the voxel 6 is converted into new three-dimensional shape data defined by the polygon 4.

The three-dimensional shape may be deformed by actually adding and deleting the voxel 6 to and from the three-dimensional shape data defined by the voxels 6, and new three-dimensional shape obtained by reflecting predetermined deformation may be generated in a case of converting the three-dimensional shape data defined by the voxels 6 into new three-dimensional shape data defined by the polygons 4 without deforming the three-dimensional shape data defined by the voxels 6.

Figure 4:
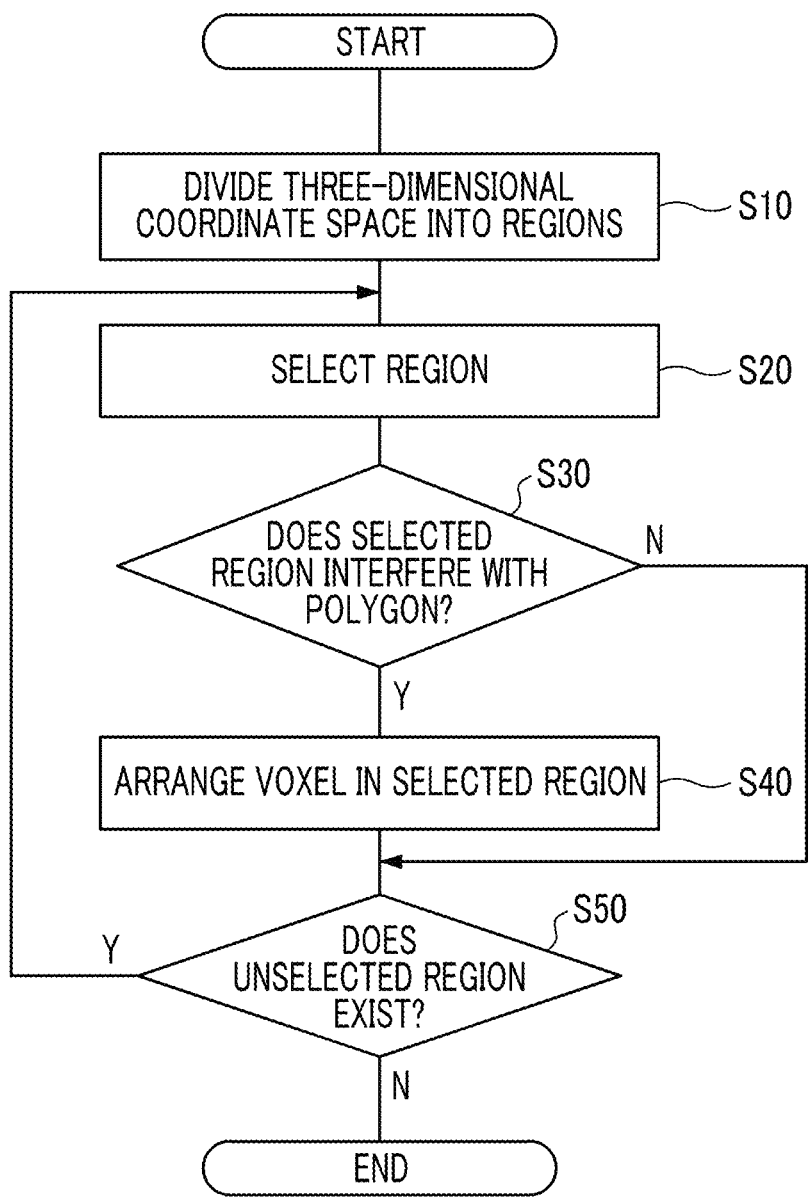
FIG. 4 is a flowchart illustrating an example of a flow of a voxel conversion process.

FIG. 4 is a flowchart illustrating an example of a flow of a voxel conversion process executed by the CPU 12A of the editing apparatus 10 in a case of converting three-dimensional shape data defining the shape of the object 2 by using the polygon 4 into three-dimensional shape data defined by using the voxel 6.

An editing program which defines the voxel conversion process illustrated in FIG. 4 is stored in advance in the ROM 12B of the editing apparatus 10, for example. The CPU 12A of the editing apparatus 10 reads the editing program stored in the ROM 12B and executes the voxel conversion process.

First, in step S10, the CPU 12A divides a three-dimensional coordinate space in which the object 2 represented by three-dimensional shape data defined by the polygons 4 (hereinafter, referred to as "the object 2 configured by the polygons 4") is arranged into a plurality of regions 8.

Figure 5:
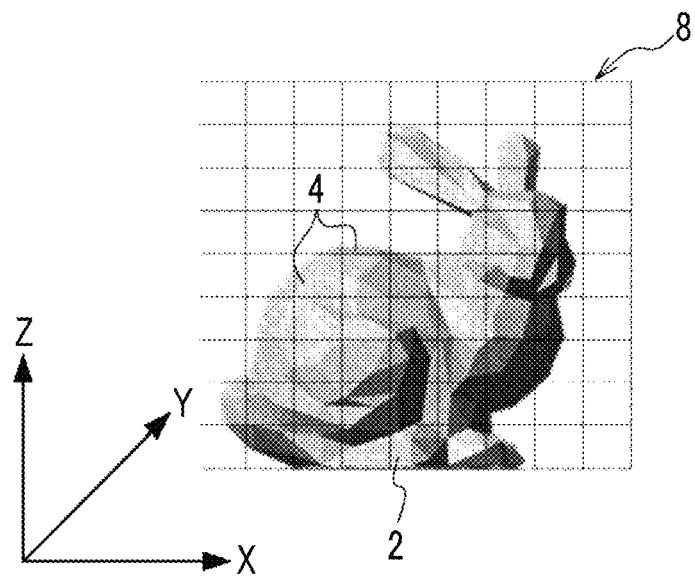
FIG. 5 is a diagram illustrating a division example in which a three-dimensional coordinate space in which the object is arranged is divided into a plurality of regions.

FIG. 5 is a diagram illustrating a division example in which a three-dimensional coordinate space in which the object 2 configured by the polygons 4 is arranged is divided into the plurality of regions 8. The example in FIG. 5 illustrates that a three-dimensional coordinate space is divided in a grid shape along the XY plane, the XZ plane, and the YZ plane. Further, the example in FIG. 5 illustrates a state in which the object 2 configured by the polygons 4 is viewed from a direction facing the XZ plane including the X-axis and the Z-axis. Although each divided region 8 is the region 8 represented by a three-dimensional shape (in this example, a cube), for convenience of explanation, in the following explanation, as illustrated in FIG. 5, the object 2 divided by the plurality of regions 8 will be described with reference to a two-dimensional view illustrating the situation as viewed from the direction orthogonal to the XZ plane. Therefore, note that a depth of the object 2 is actually in a Y-axis direction.

FIG. 5 illustrates an example in which the three-dimensional coordinate space in which the object 2 configured by the polygons 4 is arranged is divided in a grid shape along the XY plane, the XZ plane, and the YZ plane, and a method of dividing the three-dimensional coordinate space into the plurality of regions 8 is not limited to this.

For example, the three-dimensional coordinate space may be divided at different intervals in X, Y, and Z directions, and the three-dimensional coordinate space may be divided by a plane not following any of the XY plane, the XZ plane, and the YZ plane. In addition, the three-dimensional coordinate space may be divided into the plurality of regions 8 with curved surfaces. Further, the three-dimensional coordinate space may be divided so that a shape of the divided region 8 becomes a predetermined shape such as a sphere, a cylinder, a polygonal cylinder such as a triangular prism or a pentagonal prism, a triangular pyramid, a cone, or the like. Hereinafter, as an example, description will be made on the assumption that the three-dimensional coordinate space is divided into the plurality of regions 8 so that the three-dimensional coordinate space is a cube with a side length of 10 mm.

In step S20, the CPU 12A selects any one region 8 from the regions 8 divided in step S10. The region 8 selected in step S20 is referred to as the selected region 8.

In step S30, the CPU 12A determines whether or not the object 2 configured by the polygons 4 interferes with the selected region 8.

The object 2 interferes with the selected region 8 means a state in which the polygon 4 representing an outline of the object 2 is in contact with or included in the selected region 8.

In order to determine whether or not the object 2 configured by the polygons 4 interferes with the selected region 8, as an example, the CPU 12A calculates a distance with respect to the selected region 8. As a known method of managing a distance value with a sign, there is a signed distance field (SDF).

The SDF is a known technology of representing a positional relationship of three-dimensional shapes, and a distance from a predetermined location included in the selected region 8 to the nearest polygon 4 is set as a signed distance field of the selected region 8. At this time, the CPU 12A sets a plus sign to the calculated distance in a case where the predetermined location as a reference point for measuring the distance (hereinafter, referred to as "measurement point") is included in the object 2, and sets a minus sign to the calculated distance in a case where the predetermined location is not included in the object 2.

That is, in a case where the distance set in the selected region 8 is a value equal to or more than 0, the object 2 configured by the polygons 4 interferes with the selected region 8. Even in a case where the distance set in the selected region 8 is less than 0, in a case where the distance set in the selected region 8 is equal to or less than a distance to the location included in the selected region 8, the object 2 configured by the polygons 4 may interfere with the selected region 8. The definition of the sign may be reversed, and an unsigned distance value and information such as outside and inside of the object 2 may be managed separately.

The determination as to whether or not the selected region 8 and the object 2 configured by the polygons 4 interferes with each other is not limited to this, and a determination reference is set according to the situation. For example, an inner product of a vector from the measurement point to the nearest polygon 4 and a vector to each vertex forming the selected region 8 is taken, and interference between the selected region 8 and the polygon 4 may be determined based on whether or not the signs coincides with each other. A point cloud may be generated on the polygon 4, and it may be determined that the selected region 8 including the point interferes with the polygon 4.

Figure 6:
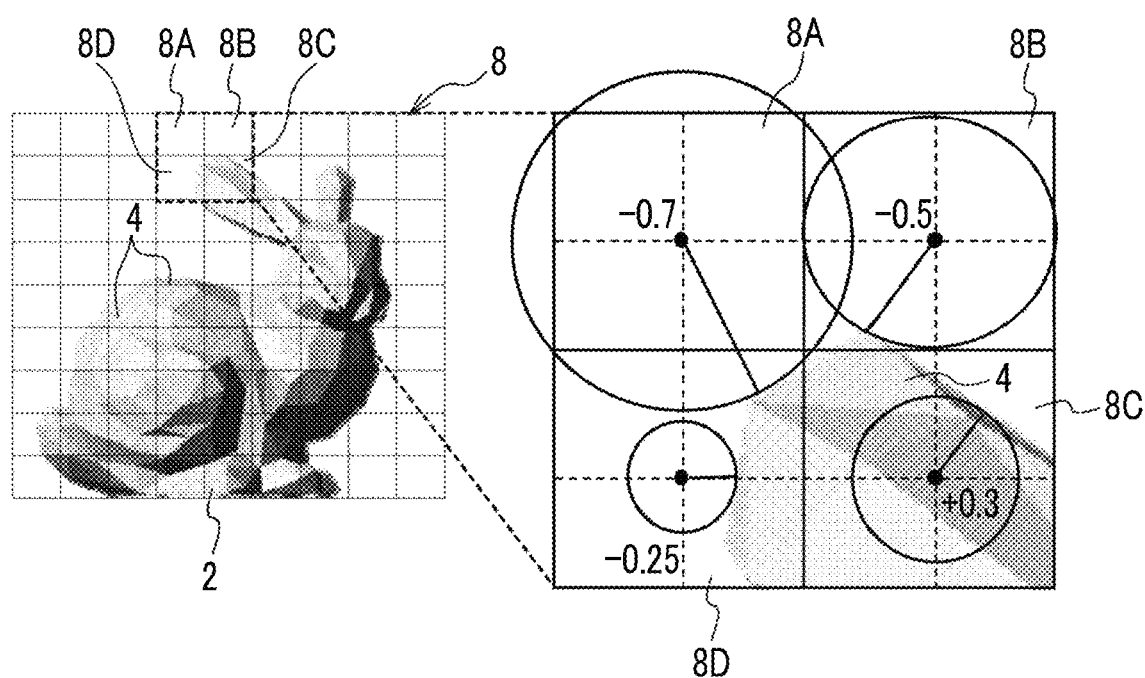
FIG. 6 is a diagram for explaining an SDF of the region and an interference state between the region and the object configured by polygons.

FIG. 6 is a diagram for explaining an SDF of the region 8 and an interference state between the region 8 and the object 2 configured by the polygons 4. In FIG. 6, as an example, attention is paid to four regions 8 of a region 8A, a region 8B, a region 8C, and a region 8D among the plurality of regions 8 in the three-dimensional coordinate space divided in step S10. Further, a predetermined location as a measurement point for a distance is set to a center of each of the regions 8A to 8D, that is, a center of the region 8 represented by cubes.

In the example of FIG. 6, it is assumed that a determination reference is defined so that in a case where a sign of the SDF set to the region 8 is plus, it is determined that the object 2 configured by the selected region 8 and the polygon 4 interferes with each other, and in a case where the sign of the SDF set to the region 8 is minus, it is determined that the object 2 configured by the selected region 8 and the polygon 4 do not interfere with each other.

In this case, since a sign of an SDF set to the region 8C is plus, the region 8C interferes with the object 2 configured by the polygons 4. Since signs of SDFs respectively set to the region 8A, the region 8B, and the region 8D are minus, the region 8A, the region 8B, and the region 8D do not interfere with the object 2 configured by the polygons 4. Hereinafter, an example of determining whether or not the selected region 8 and the object 2 configured by the polygons 4 interfere with each other according to this definition will be described.

As another definition example of the determination reference regarding interference, in the example of FIG. 6, even in a case where a sign of an SDF set to the region 8 is minus, the polygon 4 representing the outline of the object 2 is contact with or is included in the region 8 even a little, it may be defined that the object 2 interferes with the region 8. The CPU 12A stores a distance to a surface of the region 8, that is, a distance until the polygon 4 representing the outline of the object 2 is contact with the region 8 for each direction viewed from the SDF measurement point in each region 8.

First, since the sign of the SDF set to the region 8C is plus according to this determination reference, it is determined that the region 8C interferes with the object 2 configured by the polygons 4.

Regarding the region 8A, since the sign of the SDF is minus and a size of the SDF exceeds a distance to a vertex of the region 8A positioned farthest from the measurement point of the region 8A, it is determined that the region 8A does not interference with the object 2 configured by the polygons 4.

Regarding the region 8B, since the sign of the SDF is minus but a size of the SDF coincides with a radius of an inscribed circle of the region 8B having the measurement point of the region 8B as a center, it is determined that the region 8B interferences with the object 2 configured by the polygons 4.

Regarding the region 8D, since the sign of the SDF is minus but a size of the SDF is smaller than a radius of an inscribed circle of the region 8D having the measurement point of the region 8D as a center, it is determined that the region 8D interferences with the object 2 configured by the polygons 4.

Further, as still another definition example of the determination reference regarding interference, in the example of FIG. 6, even in a case where the sign of the SDF set to the region 8 is minus, a distance is a predetermined value (for example, equal to or less than ⅓ of each side of the selected region 8), it may be defined that the object 2 interferes with the region 8.

Since the sign of the SDF set to the region 8C is plus according to this determination reference, it is determined that the region 8C interferes with the object 2 configured by the polygons 4.

In the region 8A and the region 8B, in a case where the signs of the set SDFs are minus and a size of one side of the region 8 is 1, a size of the SDF exceeds ⅓, so that it is determined that the region 8A and the region 8B do not interfere with the object 2 configured by the polygons 4.

Regarding the region 8D, since the sign of the set SDF is minus but a size of the SDF is equal to or smaller than ⅓, it is determined that the region 8D interferences with the object 2 configured by the polygons 4.

In this manner, the CPU 12A determines whether or not the selected region 8 and the object 2 configured by the polygons 4 interfere with each other in accordance with the predetermined determination reference which defines the presence or absence of interference between the region 8 and the object 2 configured by the polygons 4. The determination reference for defining the presence or absence of interference between the region 8 and the object 2 configured by the polygons 4 is set by a user who operates the editing apparatus 10 and is stored in, for example, the non-volatile memory 12D.

In a case where it is determined that the object 2 configured by the polygons 4 interferes with the selected region 8 in the determination process in step S30, the process proceeds to step S40.

In step S40, the CPU 12A arranges the voxel 6 in the selected region 8, and proceeds to step S50. A three-dimensional shape of the voxel 6 arranged in the selected region 8 and a three-dimensional shape of the selected region are identical, for example, but may be different three-dimensional shapes. Here, as an example, it is assumed that the three-dimensional shape of the voxel 6 and the three-dimensional shape of the selected region 8 are identical.

FIG. 7 is a diagram illustrating an arrangement state of the voxels 6 in a case where the region 8C is selected as the selected region 8. As described with reference to FIG. 6, since it is determined that the region 8C interferes with the object 2 configured by the polygons 4, the voxel 6 is arranged in the region 8C. In the description of the present exemplary embodiment, as illustrated in FIG. 7, a hatching region of the region 8 indicates that the voxel 6 is arranged in the region 8.

The CPU 12A sets an attribute to the voxel 6 according to a characteristic of the object 2 at a location corresponding to the selected region 8. As the attribute to be set to the voxel 6, at least an SDF of the selected region 8 is set, and other attributes designated by the user such as color, strength, material, texture, transmittance, distortion amount, and the like of the object 2 are set.

The transmittance is a proportion of the amount of light transmitted through the object 2 without being reflected by the surface of the object 2 to the amount of light incident on the object 2, and is an example of an attribute representing an appearance of the object 2. The higher the transmittance of the object 2, the easier it is to see a background behind the object 2 through the object 2.

The distortion amount represents the degree of distortion generated by force acting on the object 2, and is an example of an attribute indicating the degree of force applied to the object 2.

Since a setting of an attribute to the voxel 6 means a setting of an attribute to the selected region 8 in which the voxel 6 is arranged, the setting of the attribute is also performed on the selected region 8.

On the other hand, in a case where it is determined that the object 2 configured by the polygons 4 does not interfere with the selected region 8 in the determination process in step S30, the process proceeds to step S50 without executing step S40. That is, the voxel 6 is not arranged in the selected region 8 at which it is determined that the object 2 configured by the polygons 4 does not interfere with each other. In the description of the present exemplary embodiment, a non-hatching region of the region 8 (corresponding to the region 8A, the region 8B, and the region 8D in the example in FIG. 7) is the region 8 in which the voxel 6 is not arranged.

The CPU 12A also sets an attribute including at least an SDF of the selected region 8 for the selected region 8 determined not to interfere with the object 2 configured by the polygons 4. In addition, the CPU 12A may set an attribute designated in advance by the user in the selected region 8 determined not to interfere with the object 2 configured by the polygons 4. That is, the attribute is also set in the region 8 at which the voxel 6 is not arranged.

In step S50, first, the CPU 12A determines whether or not there is an unselected region not selected yet in step S20 among the plurality of regions 8 divided in step S10. In a case where the unselected region exists, the process proceeds to step S20, and the region 8 not selected yet is selected from the plurality of regions 8 divided in step S10.

By repeatedly executing the processes from step S20 to step S50 until all of the plurality of regions 8 divided in step S10 are selected in the process in step S20, the voxel 6 is arranged in the region 8 which interferes with the object 2 configured by the polygons 4. That is, the three-dimensional shape data which defines the shape of the object 2 by using the polygon 4 is converted into three-dimensional shape data which defines the shape of the object 2 by using the voxel 6.

In a case where it is determined that all of the plurality of regions 8 divided in step S10 are selected in the determination process in step S50, a voxel conversion process illustrated in FIG. 4 is terminated.

FIG. 8 is a diagram illustrating an example in which the object 2 on the three-dimensional coordinate space configured by the polygons 4 illustrated in FIG. 5 is converted to be configured by the voxels 6 according to the voxel conversion process illustrated in FIG. 4. For convenience of explanation, FIG. 8 illustrates an example in which the three-dimensional coordinate space is roughly divided, but in a case where the region 8 is divided finely, the three-dimensional shape of the object 2 can be configured in more detail.

The CPU 12A may not arrange the voxel 6 even in the region 8 which interferes with the object 2 configured by the polygons 4 in accordance with an attribute set in the region 8. On the contrary, the CPU 12A may arrange the voxel 6 even in the region 8 which does not interfere with the object 2 configured by the polygons 4 in accordance with the attribute set in the region 8.

For example, in a case where the voxel 6 is arranged in the region 8 to which a distortion amount more than a predetermined value is set, a stress for breaking the adjacent voxel 6 may occur. Therefore, in a case where the voxel 6 is not arranged, there is an effect that a space generated by not arranging the voxel 6 becomes a buffer zone against deformation of the surrounding voxels 6 and suppresses a crack and the like generated in the object 2 due to the action of force.

Further, in a case where the voxel 6 is arranged in the region 8 which is adjacent to a location of the object 2 having strength not reaching a predetermined value and does not interfere with the object 2, a location of the object 2 estimated to be insufficient in strength is reinforced.

After the CPU 12A deforms the three-dimensional shape data of the object 2 configured by the voxels 6 generated in this manner according to a user instruction, in a case where it is necessary to use the deformed object 2 as three-dimensional shape data including a smooth curved surface, the CPU 12A converts the deformed object 2 into new three-dimensional shape data configured by the polygons 4.

The user does not necessarily need to convert the shape of the object 2 configured by the voxels 6 into new three-dimensional shape data configured by the polygons 4, and may cause the editing apparatus 10 to set an attributes in the region 8 and use the voxel 6 as it is. A method of converting the shape of the object 2 configured by the voxels 6 will be described in detail below.

First, an example of converting three-dimensional shape data of the object 2 configured by the voxels 6 into three-dimensional shape data of the object 2 configured by the polygons 4 will be described. Here, as an example, the shape of the object 2 configured by the voxels 6 is not deformed, and is converted into three-dimensional shape data of the object 2 configured by the polygons 4 by setting one an attributes.

Figure 9:
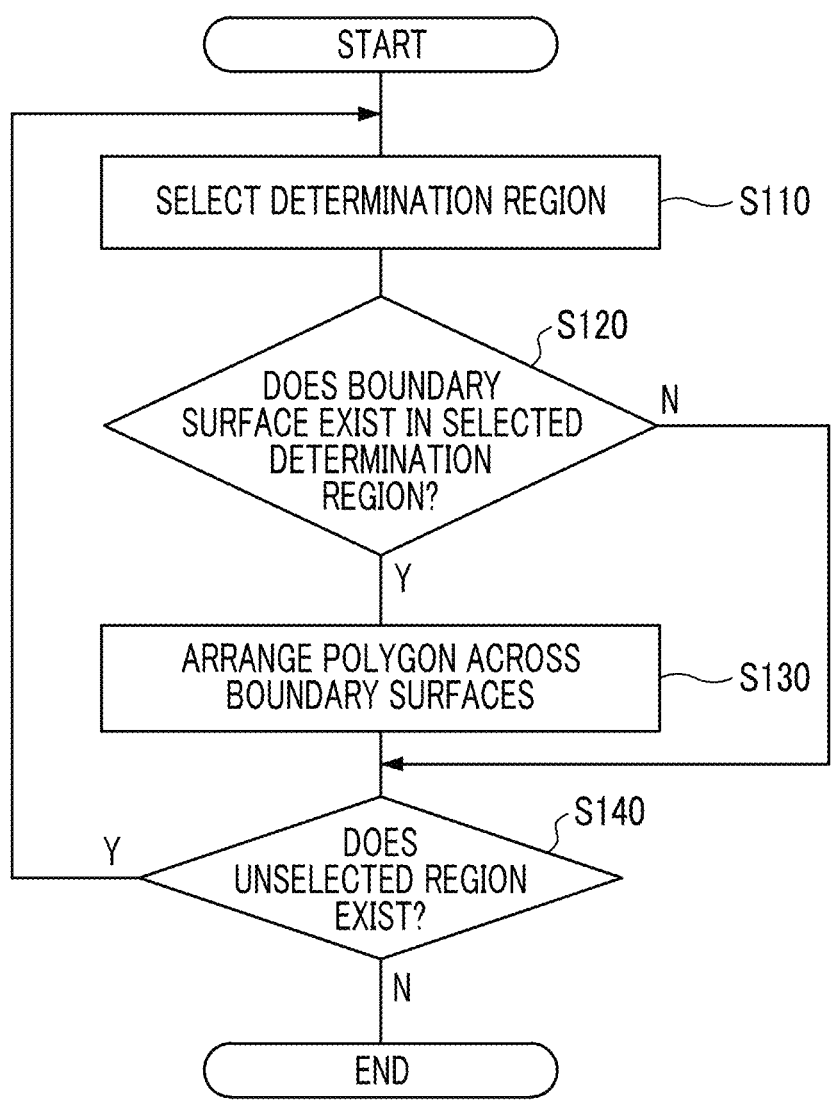
FIG. 9 is a flowchart illustrating an example of a flow of a polygon arrangement process.

FIG. 9 is a flowchart illustrating an example of a flow of a polygon arrangement process executed by the CPU 12A of the editing apparatus 10. An editing program which defines the polygon arrangement process illustrated in FIG. 9 is stored in advance in the ROM 12B of the editing apparatus 10, for example. The CPU 12A of the editing apparatus 10 reads the editing program stored in the ROM 12B and executes the polygon arrangement process.

Figure 10:
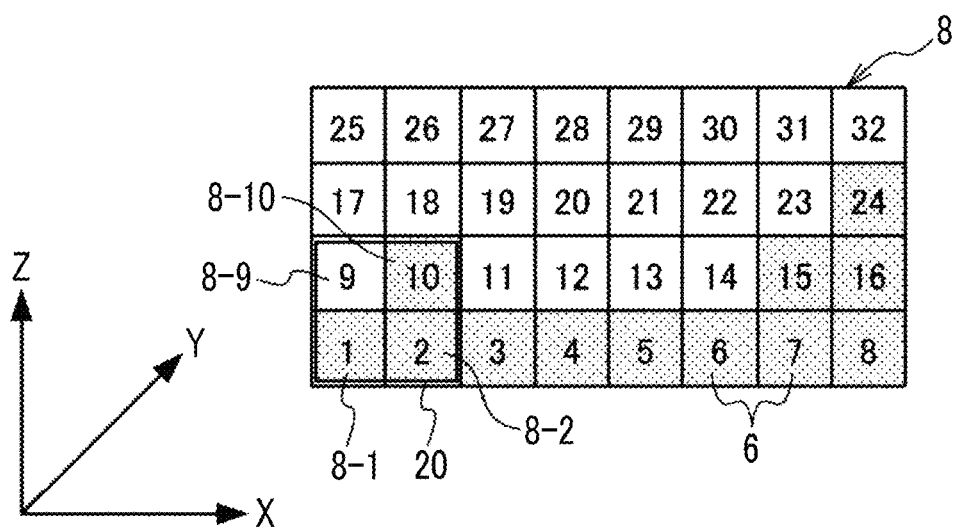
FIG. 10 is a diagram illustrating an example of three-dimensional shape data used for explaining the polygon arrangement process.

Here, the polygon arrangement process will be described using an example of three-dimensional shape data of the object 2 in which an arrangement relationship between the region 8 and the voxel 6 is seen as illustrated in FIG. 10. For convenience of explanation, a sub-reference sign is assigned to the region 8 in each in FIGS. 10 to 13. In a case where it is necessary to distinguish each region 8 from the description, for example, as illustrated in FIG. 10, the lower left region 8 to which a sub-reference sign of "1" is assigned is represented as a region 8-1 so as to distinguish the other regions 8.

In step S110 in FIG. 9, the CPU 12A selects one determination region 20 from a three-dimensional coordinate space in which the object 2 configured by the voxels 6 is arranged and divided into the plurality of regions 8.

The determination region 20 is a conversion unit for converting the voxel 6 to the polygon 4 according to an MC method, and a range including a total of the eight regions 8 for two each in the X-axis direction, the Y-axis direction, and the Z-axis direction is set as the determination region 20, for example. In FIG. 10, for example, a total of eight regions 8 consisting of a region 8-1, a region 8-2, a region 8-9, and a region 8-10 and regions 8 respectively arranged along the Y-axis direction behind the region 8-1, the region 8-2, the region 8-9, and the region 8-10 are selected as the determination region 20. In the description of the polygon arrangement process, the determination region 20 selected in step S110 is referred to as a selection determination region 20.

In step S120, the CPU 12A determines whether or not a boundary surface exists in the selection determination region 20.

The boundary surface is a surface at which the region 8 in which the voxel 6 is arranged and the region 8 in which the voxel 6 is not arranged are adjacent to each other. In the example in FIG. 10, a surface at which the region 8-1 and the region 8-9 are adjacent to each other and a surface at which the region 8-9 and the region 8-10 are adjacent to each other are examples of boundary surfaces. The region 8-1, the region 8-2, and the region 8-10 in which the voxels 6 are arranged are examples of a first region according to the present exemplary embodiment, and the region 8-9 in which the voxel 6 is not arranged is an example of a second region according to the present exemplary embodiment. In a case where there is a boundary surface in the selection determination region 20, the process proceeds to step S130.

The CPU 12A refers to an attribute of the region 8 in which the voxel 6 is arranged, and in a case where the attribute satisfies a condition that the arrangement of the voxel 6 is unnecessary, the CPU 12A may delete the voxel 6 from the region 8 in which the attribute satisfying the condition is set and determine whether or not a boundary surface exists in the selection determination region 20.

Specifically, as described above, in a case where distortion amount set in the region 8 is more than a predetermined value, the voxel 6 arranged in the region 8 may be deleted. Further, in a case where transmittance set in the region 8 is more than a predetermined value, even in a case where the voxel 6 arranged in the region 8 is deleted, an influence on the appearance shape of the object 2 is small, so the voxel 6 arranged in the region 8 may be deleted.

In a case where there is the region 8 which satisfies the condition that the arrangement of the voxel 6 is unnecessary, the CPU 12A does not need to actually delete the voxel 6 arranged in the region 8 and assumes that the voxel 6 does not exist, and it may be determined whether or not a boundary surface exists in the selection determination region 20.

In step S130, the CPU 12A arranges the polygon 4 across the boundary surfaces included in the selection determination region 20 on the voxel 6, and proceeds to step S140.

Figure 11:
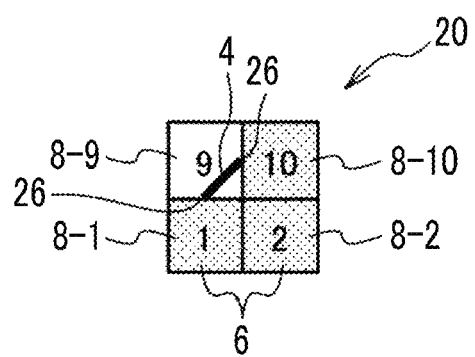
FIG. 11 is a diagram illustrating an example of a determination region.

FIG. 11 is a diagram illustrating an example in which the polygon 4 is arranged on a surface at which the region 8-1 and the region 8-9 are adjacent to each other and a surface at which the region 8-9 and the region 8-10 are adjacent to each other. The CPU 12A selects an arrangement pattern in which, for example, a vertex of the polygon 4 is arranged at a center 26 of each boundary surface from arrangement patterns of the polygon 4 prepared in advance, and arranges the polygon 4. Here, for convenience of explanation, the polygon 4 arranged based on the MC method is called an MC surface, and a vertex of the arranged polygon 4 is called an MC vertex.

On the other hand, in a case where there is no boundary surface in the selection determination region 20, the process proceeds to step S140 without executing the process in step S130. That is, in a case where there is no boundary surface in the selection determination region 20, the polygon 4 is not arranged in any one of the regions 8 included in the selection determination region 20.

In step S140, the CPU 12A determines whether or not an unselected region 8 not included in the determination region 20 selected in step S110 exists in the three-dimensional coordinate space divided into the plurality of regions 8. In a case where there is the unselected region 8, the process proceeds to step S110, and a new determination region 20 is selected in step S110. In this case, the CPU 12A selects a new determination region 20 by shifting the determination region 20 by one region in a predetermined direction of any of the X-axis direction, the Y-axis direction, and the Z-axis direction. In a case where the determination region 20 includes the last region 8 in the predetermined direction and the determination region 20 cannot be shifted in the predetermined direction any more, after the determination region 20 is shifted in a direction different from the predetermined direction by one region, the determination region 20 is repeatedly shifted in a direction opposite to the predetermined direction, so that the entire divided regions 8 may be selected.

In a case where it is determined that there is no unselected region 8 not included in the determination region 20 in the determination process in step S140, the polygon arrangement process illustrated in FIG. 9 is terminated.

Figure 12:
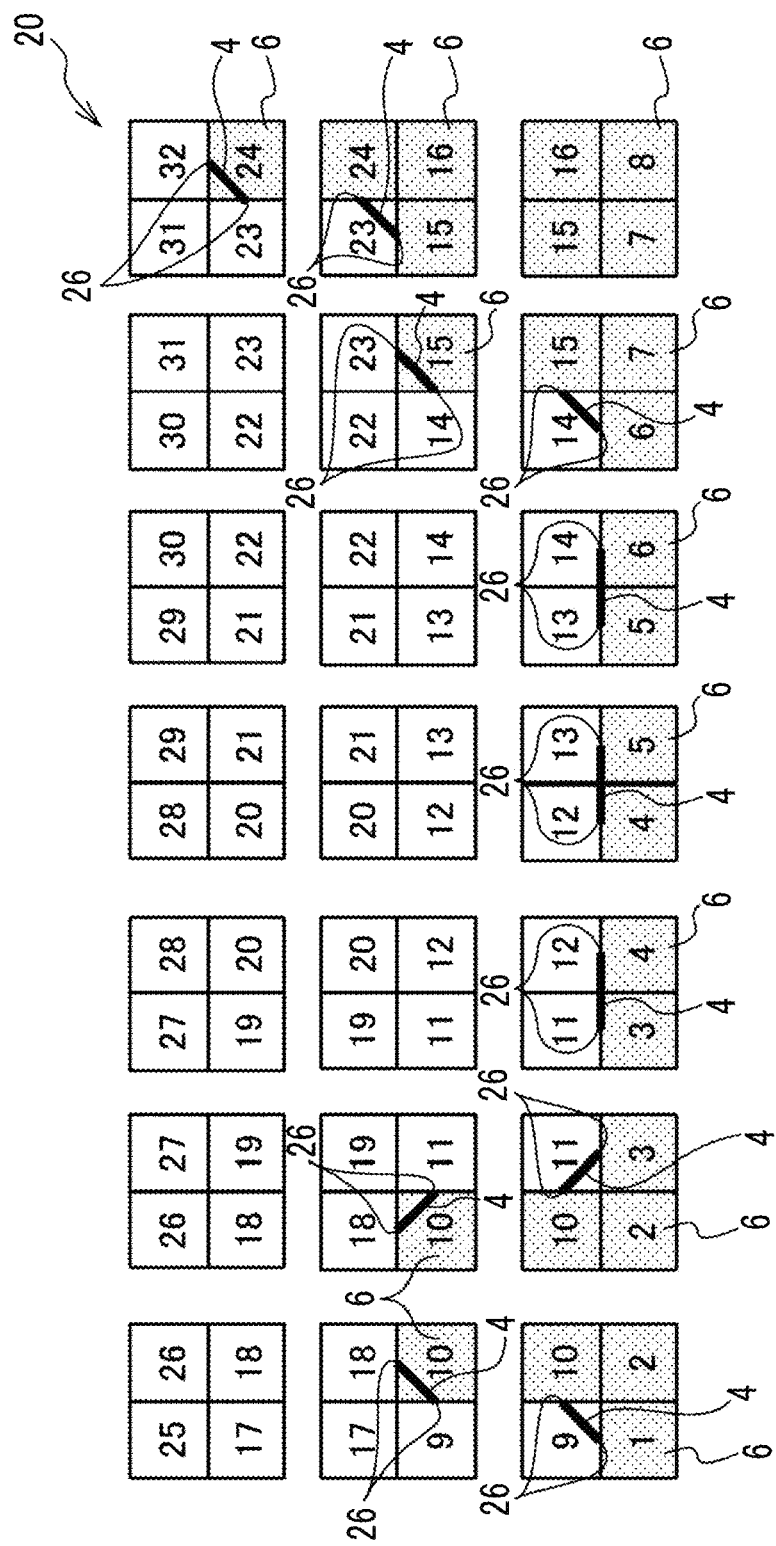
FIG. 12 is a diagram illustrating an example in which polygons are arranged on the object configured by voxels.

FIG. 12 is a diagram illustrating an example in which the polygon 4 is arranged on the boundary surface while shifting the determination region 20 by one region with respect to each region 8 illustrated in FIG. 10. In a case of arranging the polygons 4 on the identical boundary surface in the adjacent determination regions 20, the CPU 12A arranges vertexes of the polygons 4 to coincide with each other. Although there are the plurality of regions 8 in the three-dimensional coordinate space also in the Y-axis direction, only the front region 8 viewed from a direction orthogonal to the XZ plane is illustrated in FIG. 10, for convenience of explanation.

Figure 13:
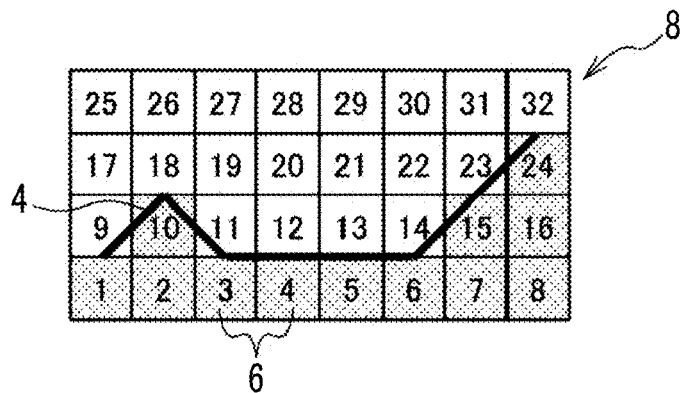
FIG. 13 is a diagram illustrating an example of three-dimensional shape data of the object configured by polygons generated by the polygon arrangement process.

FIG. 13 is a diagram illustrating an arrangement example of the polygon 4 finally arranged for each region 8 illustrated in FIG. 10 by the polygon arrangement process.

Since three-dimensional shape data of the object 2 obtained by the polygon arrangement process is obtained by simply arranging the polygon 4 so that a vertex of the polygon 4 comes to the center 26 of the boundary surface, even in a case where the editing apparatus 10 does not deform a shape of the object 2, the shape may differ from the shape of the original object 2. Therefore, a polygon correction process is executed.

Figure 14:
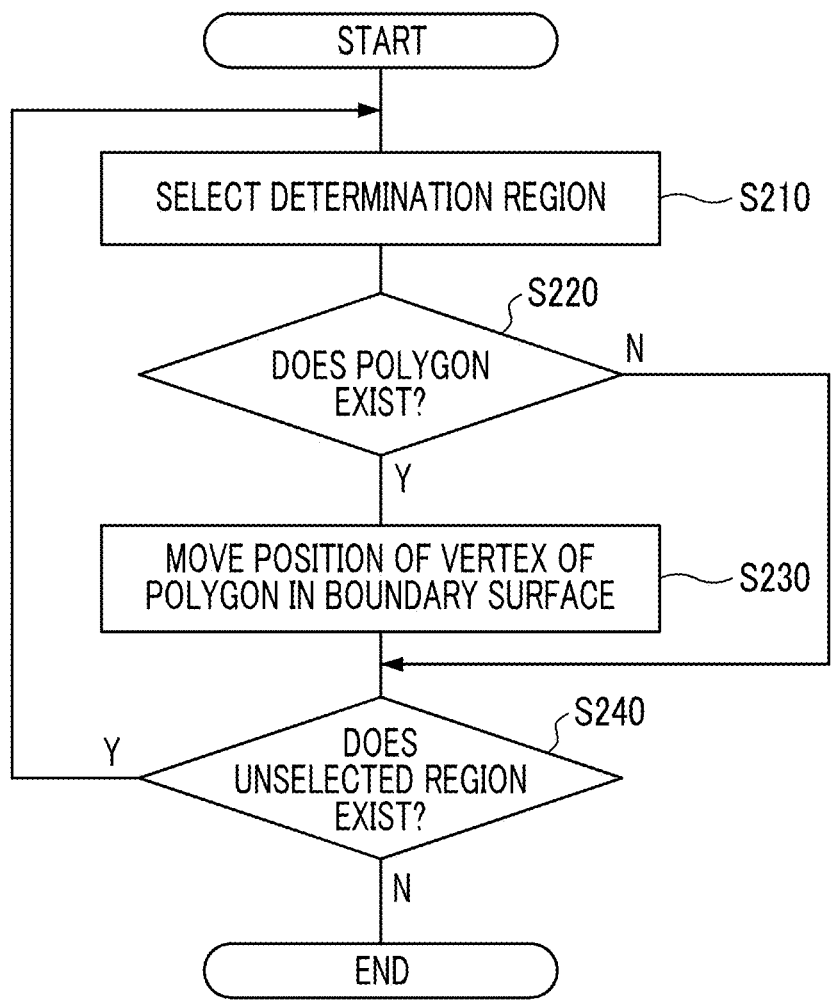
FIG. 14 is a flowchart illustrating a flow of an example of a polygon correction process.

FIG. 14 is a flowchart illustrating an example of a flow of a polygon correction process executed by the CPU 12A of the editing apparatus 10. An editing program which defines the polygon correction process illustrated in FIG. 14 is stored in advance in the ROM 12B of the editing apparatus 10, for example. The CPU 12A of the editing apparatus 10 reads the editing program stored in the ROM 12B and executes the polygon correction process.

Figure 15:
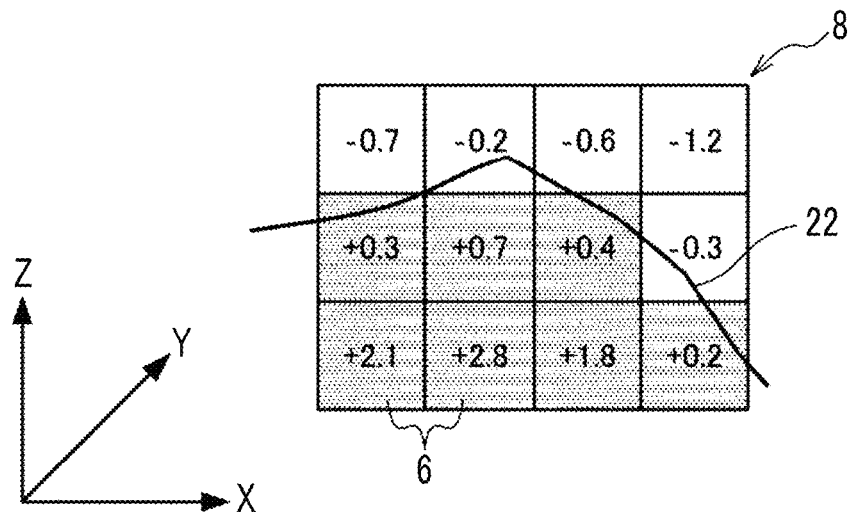
FIG. 15 is a diagram illustrating an example of three-dimensional shape data used for explaining the polygon correction process.

Here, the polygon correction process will be described using an example of three-dimensional shape data of the object 2 in which an arrangement relationship between the region 8 and the voxel 6 is seen as illustrated in FIG. 15. Numerical values described in the regions 8 in each of FIGS. 15 to 23 are SDFs set in the respective regions 8, and an outline 22 indicates an outline in a case where the original object 2 is cut along the XZ plane.

Figure 16:
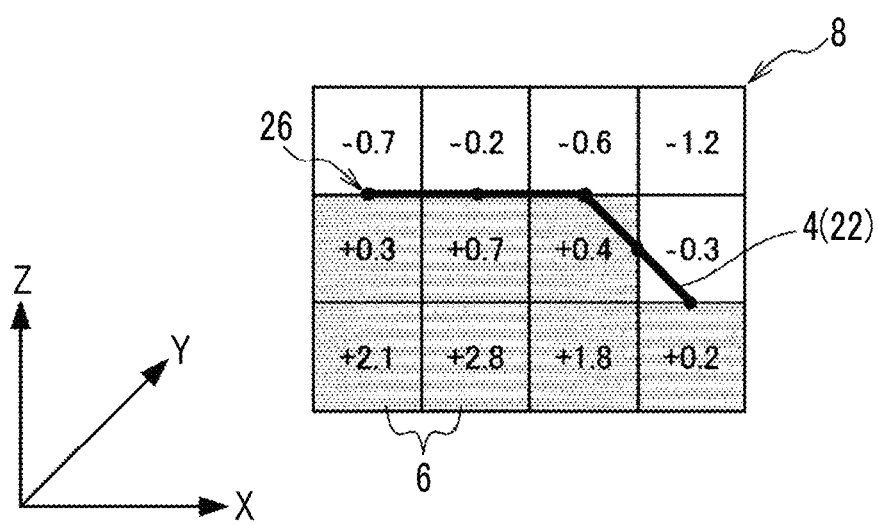
FIG. 16 is a diagram illustrating another example of the three-dimensional shape data of the object configured by the polygons generated by the polygon arrangement process.

FIG. 16 is a diagram illustrating an example in which the polygon 4 is arranged by the polygon arrangement process illustrated in FIG. 9 with respect to three-dimensional shape data of the object 2 configured by the voxels 6 illustrated in FIG. 15. In the polygon arrangement process, since the polygon 4 is arranged so that the vertex of the polygon 4 comes to the center 26 of the boundary surface, the polygon 4 is arranged around the voxel 6 as illustrated in FIG. 16, and the outline 22 of the object 2 is indicated by the polygons 4. As described by comparing the outline 22 of the original object 2 illustrated in FIG. 15 with the outline 22 of the object 2 represented by the polygon 4 in FIG. 16, in a case where only the shape of the object 2 is converted from the voxel 6 to the polygon 4 by the polygon arrangement process, the shape of the object 2 represented by converted three-dimensional shape data may be different from the shape of the original object 2.

Therefore, in step S210, the CPU 12A selects one determination region 20 from the three-dimensional coordinate space divided into the plurality of regions 8 in which the object 2 converted into the polygon 4 by the polygon arrangement process is arranged. A method of selecting the determination region 20 is the identical as the selection method described in step S110 in FIG. 9. In the description of the polygon correction process, the determination region 20 selected in step S210 is referred to as the selection determination region 20.

Figure 17:
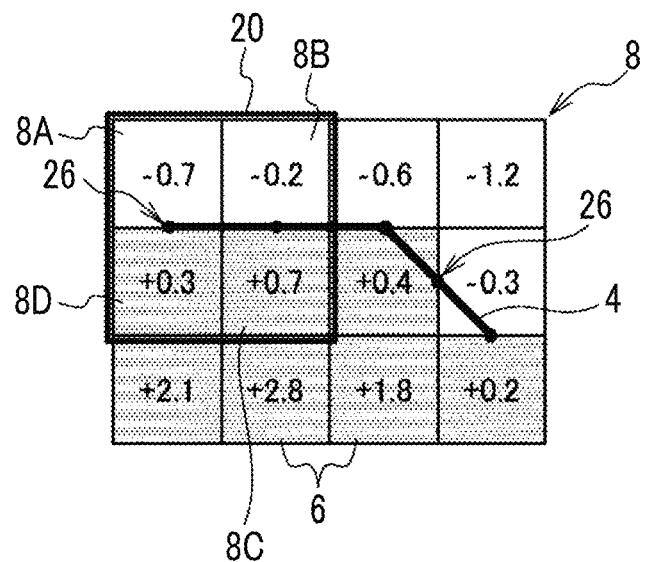
FIG. 17 is a diagram illustrating an example of a first determination region.

FIG. 17 is a diagram illustrating an example of the determination region 20 selected from the three-dimensional shape data in which the polygons 4 are arranged as illustrated in FIG. 16. For convenience of explanation, in order to distinguish each region 8 included in the determination region 20, in description of the polygon correction process, an alphabetic sub-reference sign may be assigned to each region 8 included in the determination region 20.

In step S220, the CPU 12A determines whether or not the polygon 4 exists in the selection determination region 20. In a case where the polygon 4 exists in the selection determination region 20, the process proceeds to step S230.

In step S230, the CPU 12A moves a position of a vertex of the polygon 4 arranged to be in contact with the center 26 of the boundary surface in accordance with a ratio of sizes of SDFs respectively set in the two adjacent regions 8 (referred to as a paired region) forming a boundary surface so as to correct the arrangement of the polygon 4.

Figure 18:
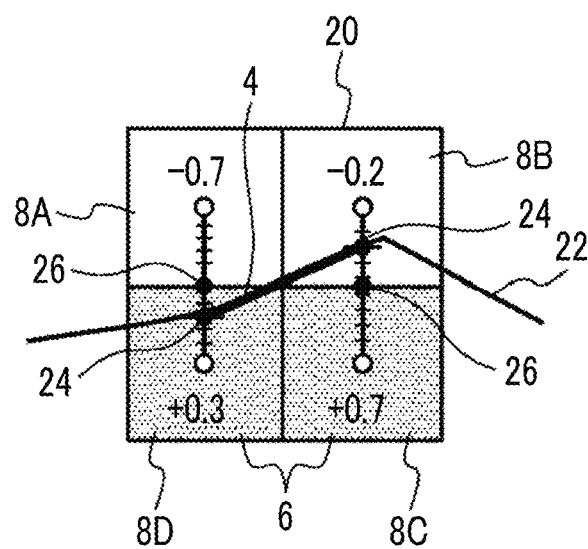
FIG. 18 is a diagram for explaining correction of polygons in the first determination region.

FIG. 18 is a diagram obtained by extracting the determination region 20 illustrated in FIG. 17. As an example of a paired region consisting of the regions 8A and 8D included and a paired region consisting of the regions 8B and 8C included in the determination region 20, an example of moving a vertex of the polygon 4 which contacts the center 26 of a boundary surface of the paired region will be described.

First, in a case of the paired region consisting of the region 8A and the region 8D, the CPU 12A calculates a distance (referred to as an "inter-region distance") between a measurement point of an SDF in the region 8A and a measurement point of an SDF in the region 8D. The CPU 12A determines a point according to a ratio of a size of the SDF of the region 8A and a size of the SDF of the region 8D in the calculated inter-region distance as a correction point 24, and moves a vertex of the polygon 4 in contact with the center 26 of the boundary surface formed by the paired region consisting of the region 8A and the region 8D to a position of the correction point 24.

That is, a point obtained by dividing the inter-region distance into 7: 3 becomes the correction point 24 of the vertex of the polygon 4 in contact with the center 26 of the boundary surface formed by the paired region consisting of the region 8A and the region 8D.

In the same manner, in a case of the paired region consisting of the region 8B and the region 8C, an SDF of the region 8B is "−0.2" and an SDF of the region 8C is "+0.7", so a point obtained by dividing an inter-region distance of the region 8B and the region 8C into 2: 7 becomes the correction point 24 of the vertex of the polygon 4 in contact with the center 26 of the boundary surface formed by the paired region consisting of the region 8B and the region 8C.

The CPU 12A corrects arrangement of the polygon 4 so that the vertex of the polygon 4 comes to the calculated position of each correction point 24. By this correction, it can be seen that the arrangement of the polygon 4 is closer to the outline 22 of the object 2 than the arrangement of the polygon 4 in the determination region 20 illustrated in FIG. 17.

On the other hand, in a case where it is determined that the polygon 4 does not exist in the selection determination region 20 in the determination process in step S220, the process proceeds to step S240 without executing step S230.

In step S240, the CPU 12A determines whether or not an unselected region 8 not included in the determination region 20 selected in step S210 exists in the three-dimensional coordinate space divided into the plurality of regions 8. In a case where there is the unselected region 8, the process proceeds to step S210, and a new determination region 20 is selected in step S210. A method of selecting the new determination region 20 is the identical as the selection method described in step S140 in FIG. 9. That is, the processes in step S210 to step S240 are repeatedly executed until there is no unselected region 8 not included in the determination region 20.

Figure 19:
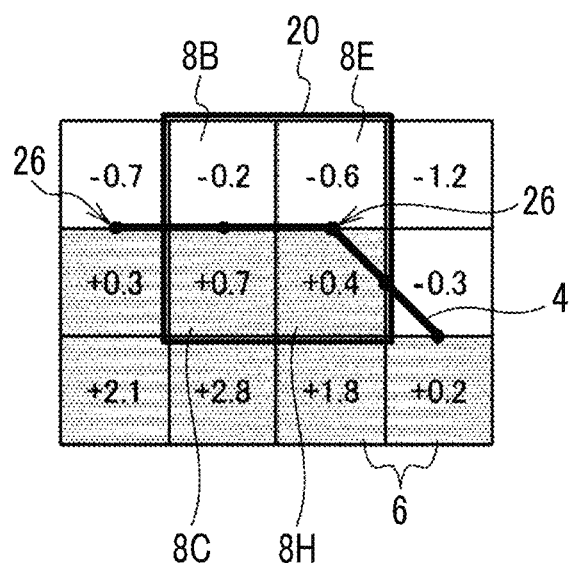
FIG. 19 is a diagram illustrating an example of a second determination region.

FIG. 19 is a diagram illustrating an example of the determination region 20 obtained by shifting the determination region 20 illustrated in FIG. 17 by one region in the X-axis direction. In the determination region 20 illustrated in FIG. 19, there are a paired region consisting of the region 8B and the region 8C and a paired region consisting of a region 8E and a region 8H.

Figure 20:
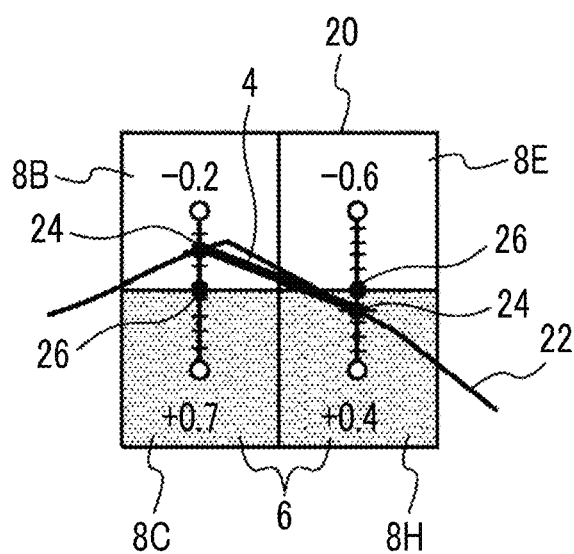
FIG. 20 is a diagram for explaining correction of polygons in the second determination region.

FIG. 20 is a diagram obtained by extracting the determination region 20 illustrated in FIG. 19. A method of calculating the correction point 24 of the vertex of the polygon 4 in contact with the center 26 of the boundary surface formed by the paired region consisting of the region 8B and the region 8C is already described.

In a case of the paired region consisting of the region 8E and the region 8H, an SDF of the region 8E is "−0.6" and an SDF of the region 8H is "+0.4", so a point obtained by dividing an inter-region distance of the region 8E and the region 8H into 6: 4 becomes the correction point 24 of the vertex of the polygon 4 in contact with the center 26 of the boundary surface formed by the paired region consisting of the region 8E and the region 8H.

Figure 21:
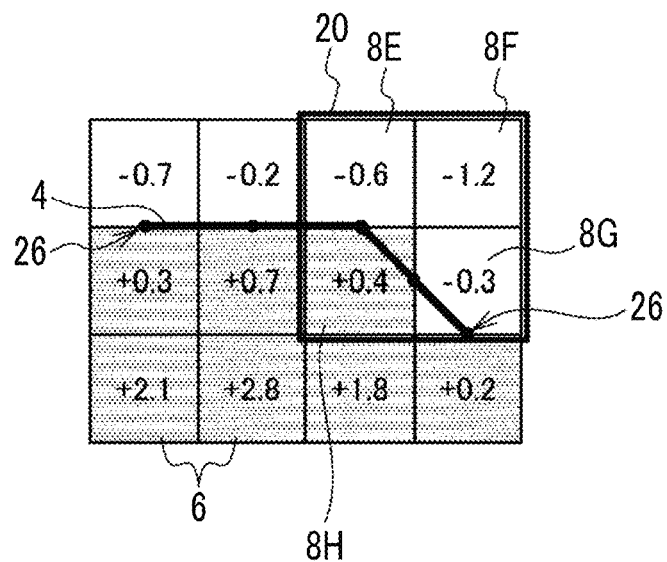
FIG. 21 is a diagram illustrating an example of a third determination region.

FIG. 21 is a diagram illustrating an example of the determination region 20 obtained by further shifting the determination region 20 illustrated in FIG. 19 by one region in the X-axis direction. In the determination region 20 illustrated in FIG. 21, there are a paired region consisting of the region 8E and the region 8H and a paired region consisting of a region 8G and a region 8H.

Figure 22:
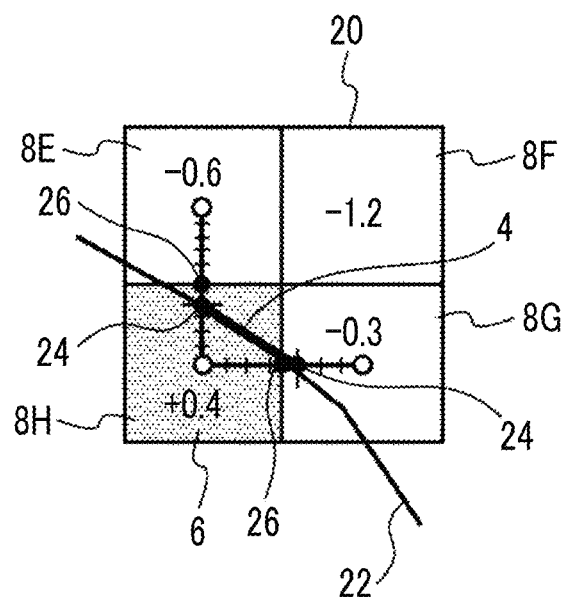
FIG. 22 is a diagram for explaining correction of polygons in the third determination region.

FIG. 22 is a diagram obtained by extracting the determination region 20 illustrated in FIG. 21. A method of calculating the correction point 24 of the vertex of the polygon 4 in contact with the center 26 of the boundary surface formed by the paired region consisting of the region 8E and the region 8H is already described.

In a case of the paired region consisting of the region 8G and the region 8H, an SDF of the region 8G is "−0.3" and an SDF of the region 8H is "+0.4", so a point obtained by dividing an inter-region distance of the region 8G and the region 8H into 3: 4 becomes the correction point 24 of the vertex of the polygon 4 in contact with the center 26 of the boundary surface formed by the paired region consisting of the region 8G and the region 8H.

Figure 23:
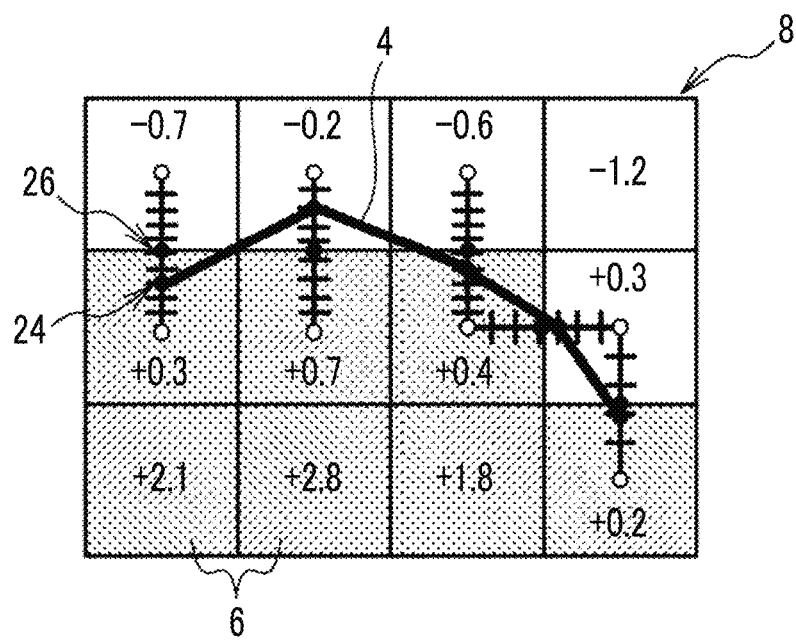
FIG. 23 is a diagram illustrating an example of three-dimensional shape data of the object configured by polygons generated by the polygon correction process.

By repeatedly executing the processes of step S210 to step S240 until the unselected region 8 not included in the determination region 20 does not exist while shifting the determination region 20 in this manner, the polygon 4 corrected so that the vertex comes to the position as illustrated in FIG. 23 is finally obtained, and the shape of the object 2 before executing the polygon correction process comes close to the shape of the original object 2.

In a case where it is determined that there is no unselected region 8 not included in the determination region 20 in the determination process in step S240, the arrangement of all the polygons 4 constituting the shape of the object 2 is corrected, so the polygon correction process illustrated in FIG. 14 is terminated.

For convenience of explanation, although the example in which the polygon correction process illustrated in FIG. 14 is executed after termination of the polygon arrangement process illustrated in FIG. 9 is described, the determination region in step S110 in FIG. 9 and the determination region in step S210 in FIG. 14 are the identical region and the determination in step S220 is positive in a case where the polygon is arranged in step S130 in FIG. 9, so the polygon arrangement process and the polygon correction process may be combined into a single process without separation so as to execute step S230 in FIG. 14 immediately after executing step 130 in FIG. 9. In this case, as a matter of course, in a case where it is determined that there is no boundary surface in the selection determination region 20 in the determination process in step S120 in FIG. 9, the process in step S130 and the process in step S230 in FIG. 14 are not executed and the process proceeds to step S140.

The CPU 12A may correct a ratio of the inter-region distance in the paired region according to the attribute of the region 8 in a case of correcting the arrangement of the polygon 4 in the process in step S230 in FIG. 14. For example, as hardness of the object 2 set in the region 8 is higher, a desired strength may be obtained with a smaller volume. In other words, the desired strength may be obtained even in a case where a hard location of the object 2 is shaved.

Therefore, in a case where the hardness of the object 2 set in the region 8 is equal to or more than a predetermined value, the CPU 12A may make the SDF value of the region 8 smaller than the original SDF value so that the vertex of the polygon 4 is closer to a measurement point of the SDF in the region 8 in which the SDF is modified, that is, the center of the region 8.

On the contrary, in a case where the hardness of the object 2 set in the region 8 is less than the predetermined value, the CPU 12A makes the SDF value of the region 8 more than the original SDF value so that the vertex of the polygon 4 may be away from the center of the region 8 in which the SDF is modified. That is, by giving the object 2 a thickness, a location at which the hardness of the object 2 is less than the predetermined value is reinforced.

Next, a deformation process on the shape of the object 2 configured by the voxels 6 in the editing apparatus 10 will be described.

Figure 24:
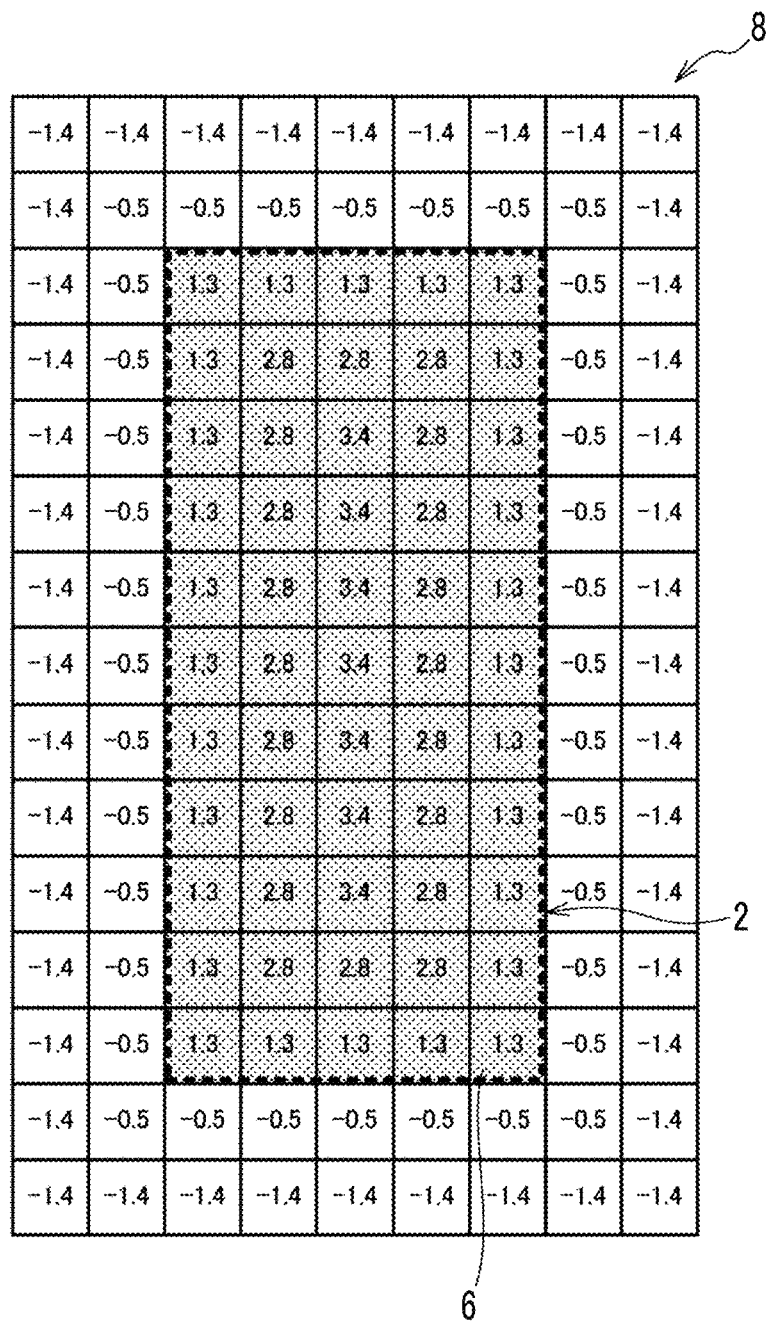
FIG. 24 is a diagram illustrating an example of three-dimensional shape data used for explaining a deformation process on polygons.

FIG. 24 is a diagram illustrating an example of three-dimensional shape data including an SDF set to each region 8 in a three-dimensional coordinate space. In FIGS. 24 to 33, a value described in each region 8 indicates the SDF of the corresponding region 8. Further, in FIGS. 24 to 33, since the region 8 in which a sign of the SDF is set to plus is the region 8 in which the voxel 6 is arranged by the voxel conversion process illustrated in FIG. 4, the hatching regions indicate the shape of the object 2.

Figure 25:
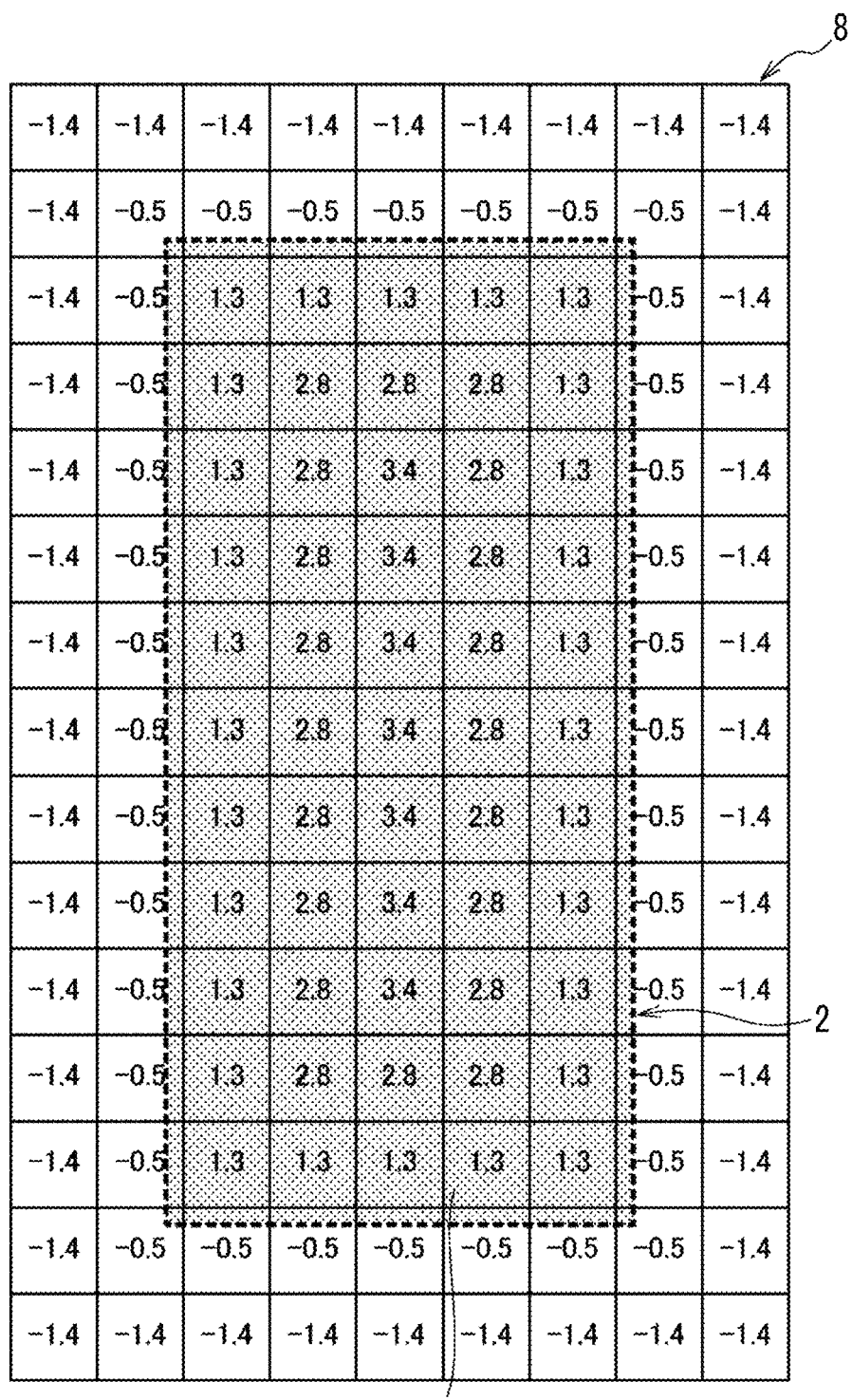
FIG. 25 is a diagram for explaining an attention point regarding a shape of the object defined by three-dimensional shape data.

As described above, arrangement of the polygons 4 forming the outline of the object 2 is corrected according to the ratio of the sizes of the SDFs of the paired region by the polygon correction process illustrated in FIG. 14. Therefore, in a case of the shape of the object 2 configured by the polygons 4 generated by the three-dimensional shape data having the SDF as illustrated in FIG. 24, the outline of the object 2 does not coincide with a boundary of the regions 8, as illustrated in FIG. 25. For example, in a case where the sign of the SDF set to the region 8 is plus and the size of the SDF is larger than a value representing the distance from the center of the region 8 to the boundary of the region 8, the outline of the object 2 is arranged farther from the boundary of the region 8 as viewed from the center of the region 8. Meanwhile, in description of a deformation process on the object 2, the generated outline of the object 2 is displayed in accordance with the boundary of the region 8 for convenience of description.

It is assumed that three-dimensional shape data to which the SDF as illustrated in FIG. 24 is set exists in each region 8 by the voxel conversion process illustrated in FIG. 4. The CPU 12A of the editing apparatus 10 deforms the shape of the object 2 by changing the SDF set to the region 8.

Specifically, the CPU 12A deforms the shape of the object 2 by performing a calculation using a designated value for the SDF of each region 8 illustrated in FIG. 24. Here, the calculation means at least one of addition, subtraction, multiplication, division, substitution, or comparison, or a combination thereof.

Figure 26:
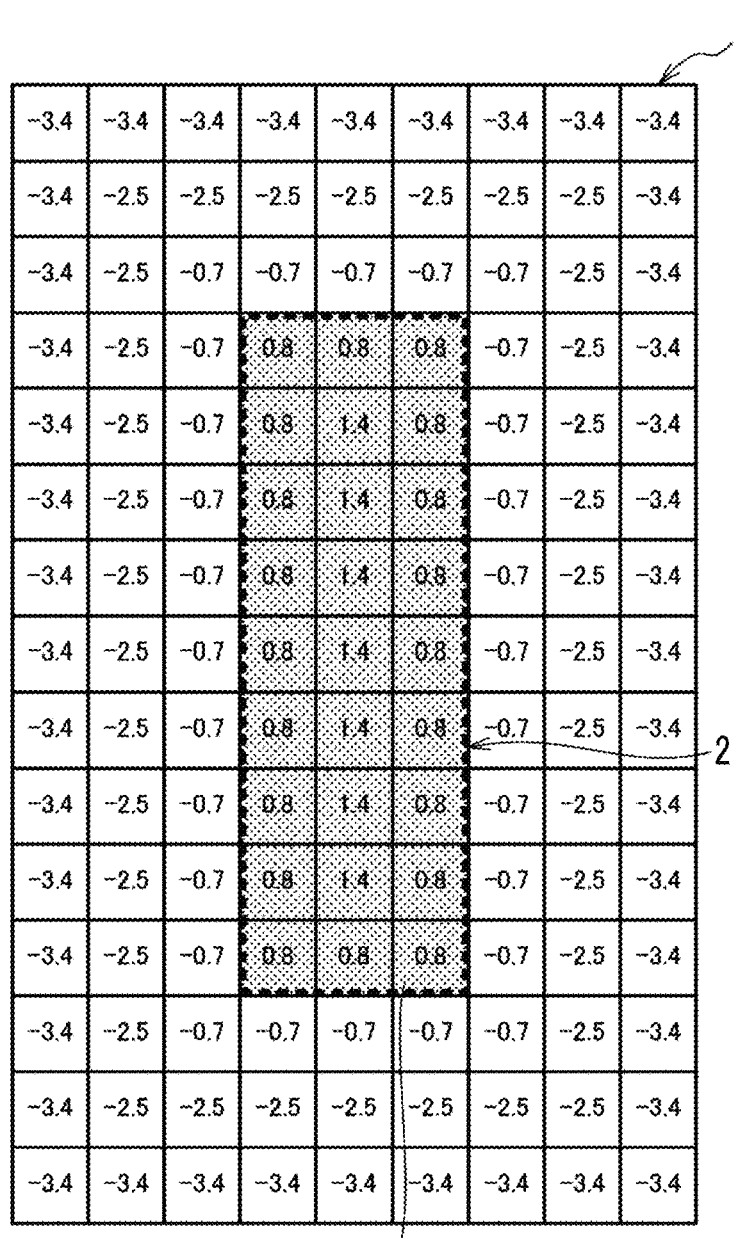
FIG. 26 is a diagram illustrating an example of three-dimensional shape data obtained by reducing the object.
Figure 30:
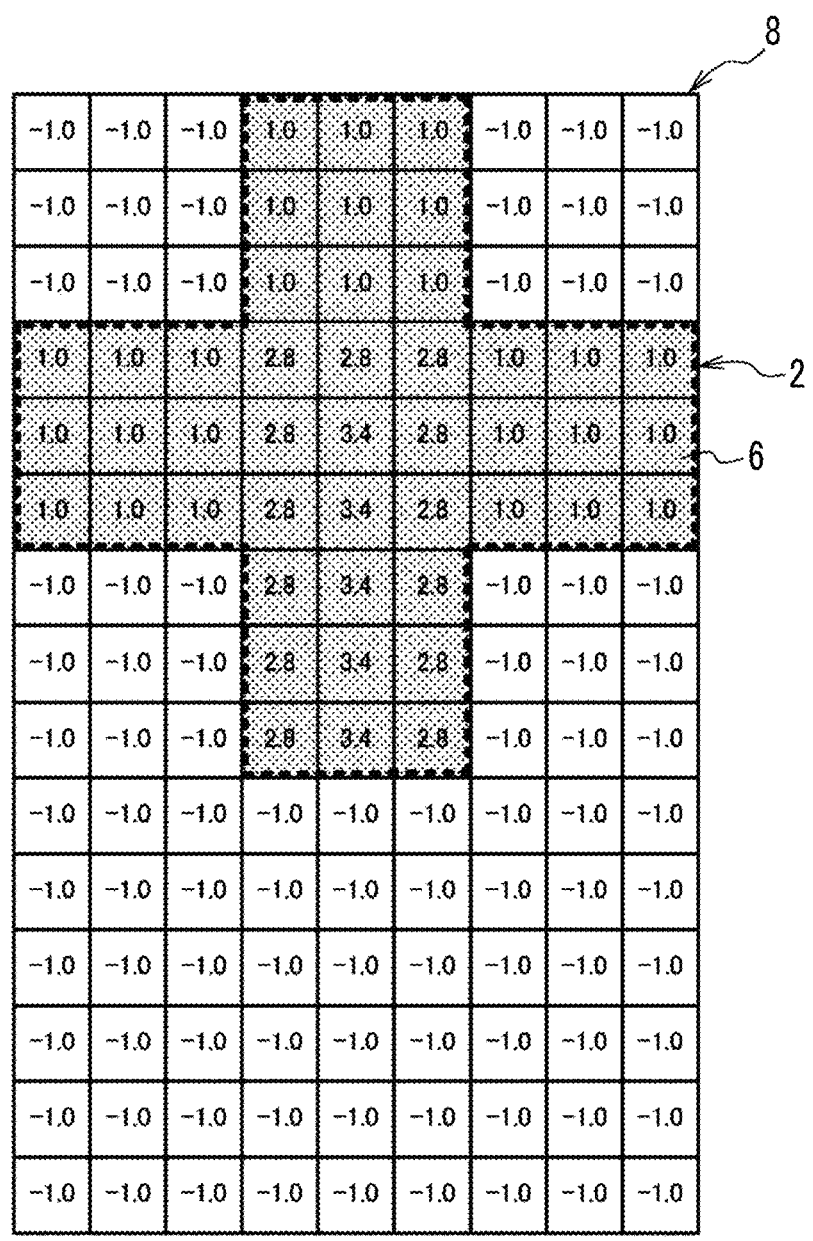
FIG. 30 is a diagram illustrating an example of three-dimensional shape data obtained by replacing an SDF for each group.

FIG. 26 is a diagram illustrating an example of three-dimensional shape data obtained by uniformly subtracting "2" from the SDF in each region 8 of the three-dimensional shape data illustrated in FIG. 24. In this case, since the number of the regions 8 in which a sign of the SDF is plus is smaller than the number of the regions 8 in which a sign of the SDF is plus in FIG. 24, three-dimensional shape data obtained by reducing the shape of the object 2 illustrated in FIG. 24 is obtained.

In addition, FIG. 27 is a diagram illustrating an example of three-dimensional shape data obtained by uniformly adding "1" to the SDF in each region 8 of the three-dimensional shape data illustrated in FIG. 24. In this case, since the number of the regions 8 in which a sign of the SDF is plus is more than the number of the regions 8 in which a sign of the SDF is plus in FIG. 24, three-dimensional shape data obtained by enlarging the shape of the object 2 illustrated in FIG. 24 is obtained.

There is no restriction on the value for calculating the SDF of the region 8, statistics such as a maximum value, a minimum value, an average value, and the like of the SDF set to each region 8 included in a range designated by a user in addition to the value designated by the user may be used as the addition amount and the subtraction amount.

In the above example, the identical value is uniformly added to or subtracted from each region 8, but the value to be added or the value to be subtracted may be changed for each region 8.

FIG. 28 is a diagram illustrating an example of three-dimensional shape data in which a value to be subtracted for each row from the upper row to the lower row is increased with respect to the SDF in each region 8 of the three-dimensional shape data illustrated in FIG. 24. In FIG. 28, a row number of the uppermost row is "1" and a row number of a row positioned below the row having the row number of 1 is "2", so that row numbers increasing by one as the row positioned below are associated.

In a case where a subtraction amount for the SDF is increased by 0.1 according to the row number so that "0.1" is subtracted from an SDF in each region 8 included in a row having the row number of 1, "0.2" is subtracted from an SDF in each region 8 included in a row having the row number of 2, and "0.1M" is subtracted from an SDF in each region 8 included in a row having the row number of M (M is an integer equal to or more than 1), the sign of the SDF in the region 8 included in the lower row is more likely to be minus, so three-dimensional shape data with a gradient so that the shape of the object 2 is tapered is obtained.

In this manner, by adding a gradient to the subtraction amount or the addition amount with respect to the SDF in the region 8, the shape of the object 2 corresponding to the purpose desired by the user is obtained such as thickening a location of the object 2 of which strength is to be increased, thinning a location of the object with no problem even in a case where strength of the location is inferior, and adding a draft angle of a mold. The CPU 12A refers to an attribute (for example, strength) set in the region 8, and may change the subtraction amount or the addition amount for the SDF for each region 8 according to contents of the attribute.

In addition, although the example of deforming the shape of the object 2 by performing the calculation on the SDF set to the region 8 is described here, the CPU 12A may branch the calculation according to, for example, some mathematical equations or a comparison result, change arrangement of the voxels 6 by changing the SDF of the region 8, and deform the shape of the object 2.

As a matter of course, the calculation for the selected region 8 of the object 2 is not limited to the entire object at a time, and in addition to performing the calculation only on a range designated by the user, the calculation may be performed only on a specific range satisfying conditions such as a certain curvature, an SDF value, a width represented by the number of sets of voxels 6, thickness, and the like.

Further, the CPU 12A of the editing apparatus 10 deforms the shape of the object 2 by replacing the SDF set to the region 8 with another value.

FIG. 29 is a diagram illustrating an example in which each region 8 represented by the three-dimensional shape data illustrated in FIG. 24 is divided into a plurality of groups 28A to 28G. An SDF of each region 8 included in the group 28A, the group 28C, and the group 28G is replaced with "−1.0", and an SDF of each region 8 included in the group 28B, the group 28D, and the group 28F is replaced with "+1.0", the object 2 is deformed into the shape illustrated in FIG. 30.

A range in which an SDF is replaced is designated by the user, for example. Further, there is no restriction on a shape of the range in which the SDF is replaced, and the range is designated by a predetermined three-dimensional shape such as a cube, a triangular pyramid, a sphere, a cylinder, or the like without being limited to a rectangular parallelepiped. In addition, it is not always necessary to designate the range in which the SDF is replaced by the three-dimensional shape, and the range may be designated with a predetermined two-dimensional shape such as a rectangle, a circle, a triangle, a trapezoid, a rhombus, and the like.

In a case of designating the range in which the SDF is replaced, it is not necessary to designate a range along the boundary of the region 8, and for example, a range passing through the middle of the region 8 to intersect with the region 8 may be designated.

Further, the range in which the SDF is replaced may be designated for each region 8, or may be designated by an SDF value or an attribute value of the region 8. For example, a set of regions 8 satisfying conditions that an SDF is within ±0.5, a display color is red, the distortion amount is equal to or more than a certain level, a curvature of a formation surface of the original three-dimensional shape, a curvature of a new three-dimensional shape configured by polygons converted from three-dimensional elements, and the like may be set as a range in which the SDF is replaced.

Further, the CPU 12A of the editing apparatus 10 deforms the shape of the object 2 by reversing a sign of the SDF set to the region 8.

Figure 32:
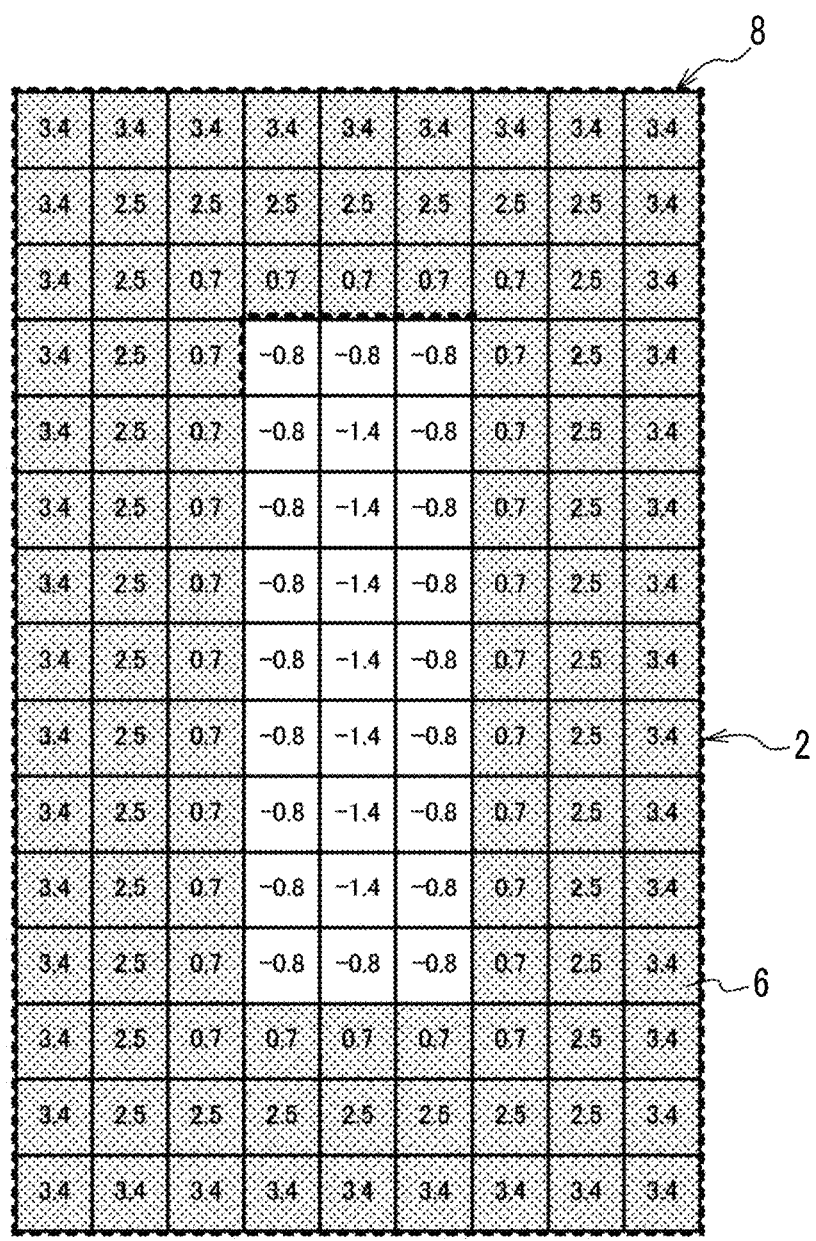
FIG. 32 is a diagram illustrating an example of three-dimensional shape data obtained by determining a sign of the SDF set to the region.

FIG. 31 is a diagram illustrating an example of three-dimensional shape data including an SDF set to each region 8 in a three-dimensional coordinate space. FIG. 32 is obtained by reversing a sign of the SDF set to each region 8 with respect to the three-dimensional shape data as illustrated in FIG. 31.

In a case where a minus SDF is converted into a plus SDF and a plus SDF is converted into a minus SDF in FIG. 31, and the voxel 6 is not arranged in the region 8 in which the voxel 6 is arranged and the voxel 6 is arranged in the region 8 in which the voxel 6 is not arranged in FIG. 31, the converted shape of the object 2 is obtained. That is, the shape of the object 2 illustrated in FIG. 32 is a shape (referred to as a "paired shape") which fits with the shape of the object illustrated in FIG. 31.

As a matter of course, there is no restriction on a method of designating a range in which a sign of an SDF is reversed, and the designation method described in the method of designating the range in which the SDF is replaced is applied.

Further, the CPU 12A of the editing apparatus 10 compares the SDF set to the region 8 for each region 8 of the three-dimensional coordinate space including the shape of the object 2, selects one SDF for each region 8 to be compared based on a predetermined selection rule common to each region 8, and sets the selected SDF as a new SDF in the compared region 8 so as to deform the shape of the object 2.

For example, it is assumed that there are three-dimensional shape data as illustrated in FIG. 24 and three-dimensional shape data as illustrated in FIG. 32. Here, the description is performed based on the assumption that origins of three-dimensional coordinate spaces in respective pieces of three-dimensional shape data are common, but the user may adjust the origin to a predetermined position, and sizes or coordinate systems of the selected regions 8 may be different from one another. In a case where pitches or coordinate systems do not coincide with one another, an interpolation process such as Nearest Neighbor, Bilinear, Bicubic, or the like may be combined, coordinate conversion may be performed, or a selection rule may be provided between different coordinate systems.

The CPU 12A compares SDFs in the regions 8 at the identical position in the three-dimensional shape data illustrated in FIG. 24 and the three-dimensional shape data illustrated in FIG. 32 so as to generate three-dimensional shape data in which any one SDF is set as a new SDF of the region 8 for each region 8.

FIG. 33 is a diagram illustrating an example of three-dimensional shape data obtained by setting a small SDF as a new SDF among SDFs of the regions 8 at the identical position in the three-dimensional shape data illustrated in FIG. 24 and the three-dimensional shape data illustrated in FIG. 32, to each region 8.

In this case, as illustrated in FIG. 33, locations at which the object represented by the three-dimensional shape data illustrated in FIG. 24 and the object 2 represented by the three-dimensional shape data illustrated in FIG. 32 overlap with each other, that is, three-dimensional shape data of the object 2 indicating common locations is obtained.

The selection rule of selecting the smaller SDF among the SDFs to be compared is an example of a selection rule common to the respective regions 8 according to the present exemplary embodiment, and the larger SDF may be selected, for example. In this case, three-dimensional shape data obtained by combining the two objects 2 to be compared is obtained.

Further, a selection rule corresponding to an attribute set for each region 8 or three-dimensional element may be used. For example, in a case where the larger SDF is selected among SDFs to be compared in a case where attributes indicating specific materials are set in the regions 8, three-dimensional shape data obtained by combining the objects 2 in which the specific materials are continuous is obtained. In addition, arrangement of three-dimensional elements is not changed at all, and only attributes set in the respective region 8 are set as comparison targets, so that only arrangement of colors and materials may be changed without changing a three-dimensional shape of the object 2.

The CPU 12A may designate regions for comparing SDFs. There is no restriction on a method of designating the regions for comparing the SDFs, and the designation method described in the method of designating the range in which the SDF is replaced is applied.

Further, the editing apparatus 10 does not necessarily need to implement the voxel conversion process illustrated in FIG. 4, receives three-dimensional shape data configured by the voxels 6 to be edited, and may execute at least one of a deformation process, a polygon arrangement process, or a polygon correction process of the object 2 on the received three-dimensional shape data.

As described above, according to the editing apparatus 10 according to the present exemplary embodiment, instead of directly editing three-dimensional shape data of the original object 2 configured by the polygons 4 so as to deform the shape of the object 2, the shape of the object 2 is deformed after being converted into three-dimensional shape data of the object 2 configured by the voxels 6. In addition, in a case of converting three-dimensional shape data of the object 2 configured by the voxels 6 into three-dimensional shape data of the object 2 configured by the polygons 4, the editing apparatus 10 according to the present exemplary embodiment corrects a position of a vertex of the polygon 4 according to a ratio of sizes of SDFs respectively set to paired regions.

Although the editing apparatus 10 according to the present exemplary embodiment determines the region 8 in which the voxel 6 is to be arranged based on the SDF, as long as a value represents an interference state between the region 8 and the polygon 4, the region 8 in which the voxel 6 is arranged may be determined using the value other than the SDF.

Although the present exemplary embodiment of the invention is described by using the exemplary embodiment, the present exemplary embodiment of the invention is not limited to the scope described in the exemplary embodiment. Various modifications or improvements can be added to the exemplary embodiment without departing from the gist of the present exemplary embodiment of the invention and the modified or improved form is also included in the technical scope of the present exemplary embodiment of the invention. For example, an order of the processes may be changed without departing from the scope of the present invention.

In the exemplary embodiment, the form in which each process is realized by software is described as an example, but processes equivalent to the flowcharts illustrated in FIGS. 4, 9, and 14 may be implemented on an application specific integrated circuit (ASIC), a field programmable gate array (FPGA), or a programmable logic device (PLD) and processed by hardware. In this case, a processing speed can be increased compared to the case where each process is realized by software.

In this manner, the CPU 12A, which is an example of a general-purpose processor, may be replaced with a dedicated processor specialized in a specific process such as an ASIC, an FPGA, a PLD, a graphics processing unit (GPU), and a floating point unit (FPU).

Further, an operation of a processor in each exemplary embodiment may be realized by a plurality of processors instead of being realized by one CPU 12A. Further, the operation of the processor in each exemplary embodiment may be realized by cooperation of processors included in a plurality of computers 12 existing at physically separated positions.

In the exemplary embodiment described above, the form in which a three-dimensional shape data editing program is installed in the ROM 12B is described, but the exemplary embodiment is not limited thereto. The three-dimensional shape data editing program can be provided in a form recorded in a computer-readable storage medium. For example, which the three-dimensional shape data editing program may be provided by being recorded on an optical disc such as a compact disc (CD)-ROM, a digital versatile disc (DVD)-ROM, or the like. In addition, the three-dimensional shape data editing program may be provided in a form of being recorded in a portable semiconductor memory such as a universal serial bus (USB) memory or a memory card.

Further, the editing apparatus 10 may obtain the three-dimensional shape data editing program according to the present exemplary embodiment from an external device connected to a communication line through the communication unit 18.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A three-dimensional shape data editing apparatus comprising:
   a processor configured to
   set, based on three-dimensional shape data of a surface of a three-dimensional shape of an object configured by using a formation surface of at least one of a plurality of flat surfaces or curved surfaces, for each of a plurality of divided three-dimensional regions, a distance from a predetermined location of the region to the formation surface of the three-dimensional shape of the object configured by the formation surface, wherein the three-dimensional shape data comprising a position, an arrangement direction of the formation surface and information on connection with an adjacent formation surface,
   arrange the formation surface at a boundary between a first region in which a three-dimensional element is arranged and a second region in which a three-dimensional element is not arranged, among the regions, and
   adjust a vertex of the formation surface arranged at the boundary between the first region and the second region in accordance with a ratio of the distances respectively set to the first region and the second region.

2. The three-dimensional shape data editing apparatus according to claim 1,
   wherein in a case where the formation surface at a position represented by the distance from the predetermined location interferes with the region including the predetermined location as a measurement point of the distance, the processor arranges a three-dimensional element in the region with which the formation surface interferes, and converts the three-dimensional shape of the object configured by the formation surface into a three-dimensional shape configured by the three-dimensional element.

3. The three-dimensional shape data editing apparatus according to claim 2,
wherein the processor sets an attribute indicating a characteristic of the region to each of the regions.

4. The three-dimensional shape data editing apparatus according to claim 3,
the processor refers to the attribute for each of the three-dimensional regions, and in a case where the attribute satisfies a predetermined condition that does not require arrangement of a three-dimensional element, the processor does not arrange the three-dimensional element in the region to which the attribute satisfying the predetermined condition is set.

5. The three-dimensional shape data editing apparatus according to claim 4,
wherein by changing the distance set to the region, the processor deforms at least one of a three-dimensional shape of the object configured by a three-dimensional element or a new three-dimensional shape configured by using the formation surface from the three-dimensional shape configured by the three-dimensional element.

6. The three-dimensional shape data editing apparatus according to claim 3,
wherein by changing the distance set to the region, the processor deforms at least one of a three-dimensional shape of the object configured by a three-dimensional element or a new three-dimensional shape configured by using the formation surface from the three-dimensional shape configured by the three-dimensional element.

7. The three-dimensional shape data editing apparatus according to claim 6,
wherein by performing at least one type of calculation of addition, subtraction, multiplication, division, substitution, or comparison of a value on the distance set to the region, the processor deforms at least one of a three-dimensional shape of the object configured by a three-dimensional element or a new three-dimensional shape configured by using the formation surface from a three-dimensional shape configured by the three-dimensional element.

8. The three-dimensional shape data editing apparatus according to claim 2,
wherein the processor sets an attribute indicating a characteristic of the region to each of the regions in which a three-dimensional element is arranged.

9. The three-dimensional shape data editing apparatus according to claim 8,
wherein by changing the distance set to the region, the processor deforms at least one of a three-dimensional shape of the object configured by a three-dimensional element or a new three-dimensional shape configured by using the formation surface from the three-dimensional shape configured by the three-dimensional element.

10. The three-dimensional shape data editing apparatus according to claim 2,
wherein by changing the distance set to the region, the processor deforms at least one of a three-dimensional shape of the object configured by a three-dimensional element or a new three-dimensional shape configured by using the formation surface from the three-dimensional shape configured by the three-dimensional element.

11. The three-dimensional shape data editing apparatus according to claim 10,
wherein by performing at least one type of calculation of addition, subtraction, multiplication, division, substitution, or comparison of a value on the distance set to the region, the processor deforms at least one of a three-dimensional shape of the object configured by a three-dimensional element or a new three-dimensional shape configured by using the formation surface from the three-dimensional shape configured by the three-dimensional element.

12. The three-dimensional shape data editing apparatus according to claim 1,
wherein by changing the distance set to the region, the processor deforms at least one of a three-dimensional shape of the object configured by a three-dimensional element or a new three-dimensional shape configured by using the formation surface from the three-dimensional shape configured by the three-dimensional element.

13. The three-dimensional shape data editing apparatus according to claim 12,
wherein by performing at least one type of calculation of addition, subtraction, multiplication, division, substitution, or comparison of a value on the distance set to the region, the processor deforms at least one of a three-dimensional shape of the object configured by a three-dimensional element or a new three-dimensional shape configured by using the formation surface from the three-dimensional shape configured by the three-dimensional element.

14. The three-dimensional shape data editing apparatus according to claim 13,
wherein the processor changes the value in accordance with an attribute indicating a characteristic of the region.

15. The three-dimensional shape data editing apparatus according to claim 12,
the processor compares the distances set to the regions including the three-dimensional shape of the object having different shapes for each region,
selects one of the distances for each region based on a selection rule common to the regions, and
deforms the three-dimensional shape of the object configured by three-dimensional elements by setting the selected distance as the new distance in the region.

16. The three-dimensional shape data editing apparatus according to claim 12,
wherein the processor designates a range of the regions in which the distance is changed.

17. A three-dimensional shape data editing apparatus comprising:
a processor configured to
convert, for each of a plurality of divided three-dimensional regions, a three-dimensional shape configured by a three-dimensional element arranged in the region to which a distance from a predetermined location of the region to a formation surface constituting a three-dimensional shape of an object, the formation surface being at least one of a plurality of flat surfaces or curved surfaces, is set into a new three-dimensional shape configured by using the formation surface, wherein the distance is set based on three-dimensional shape data, wherein the three-dimensional shape data comprising a position, an arrangement direction of the formation surface and information on connection with an adjacent formation surface, arrange the formation surface at a boundary between a first region in which a three-dimensional element is arranged and a second region in which a three-dimensional element is not arranged, among the regions, and adjust a vertex of the formation surface arranged at the boundary between the first region and the second region in accordance with a ratio of the distances respectively set to the first region and the second region.

18. The three-dimensional shape data editing apparatus according to claim 17, wherein the processor corrects the ratio of the distances in accordance with an attribute indicating a characteristic of the region.

19. A non-transitory computer readable medium storing a three-dimensional shape data editing program causing a computer to:

convert, for each of a plurality of divided three-dimensional regions, a three-dimensional shape configured by a three-dimensional element arranged in the region to which a distance from a predetermined location of the region to a formation surface constituting a three-dimensional shape of an object, the formation surface being at least one of a plurality of flat surfaces or curved surfaces, is set into a new three-dimensional shape configured by using the formation surface, wherein the distance is set based on three-dimensional shape data, wherein the three-dimensional shape data comprising a position, an arrangement direction of the formation surface and information on connection with an adjacent formation surface, arrange the formation surface at a boundary between a first region in which a three-dimensional element is arranged and a second region in which a three-dimensional element is not arranged, among the regions, and adjust a vertex of the formation surface arranged at the boundary between the first region and the second region in accordance with a ratio of the distances respectively set to the first region and the second region.

* * * * *